United States Patent
Overfield et al.

(10) Patent No.: US 11,801,773 B1
(45) Date of Patent: Oct. 31, 2023

(54) METHODS AND SYSTEMS FOR GROUND-BASED THERMAL CONDITIONING FOR AN ELECTRIC AIRCRAFT

(71) Applicant: BETA AIR, LLC, South Burlington, VT (US)

(72) Inventors: Sarah Overfield, South Burlington, VT (US); Sean Donovan, Richmond, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/890,716

(22) Filed: Aug. 18, 2022

(51) Int. Cl.
| | | |
|---|---|---|
| *B60L 58/26* | (2019.01) | |
| *B64F 5/40* | (2017.01) | |
| *H01M 10/613* | (2014.01) | |
| *H01M 10/625* | (2014.01) | |
| *H01M 10/6567* | (2014.01) | |
| *B60L 53/00* | (2019.01) | |

(52) U.S. Cl.
CPC .......... *B60L 58/26* (2019.02); *B64F 5/40* (2017.01); *H01M 10/613* (2015.04); *H01M 10/625* (2015.04); *H01M 10/6567* (2015.04); *B60L 53/00* (2019.02); *B60L 2200/10* (2013.01); *H01M 2220/20* (2013.01)

(58) Field of Classification Search
CPC ...... B60L 58/26; B60L 53/00; B60L 2200/10; H01M 10/613; H01M 10/625; H01M 10/6567; H01M 2220/20; B64F 5/40
See application file for complete search history.

(56) References Cited

U.S. PATENT DOCUMENTS

| | | | | |
|---|---|---|---|---|
| 5,172,752 A | * | 12/1992 | Goetz, Jr. | F28D 1/05383 165/41 |
| 5,412,304 A | * | 5/1995 | Abbott | B60L 53/18 320/108 |
| 5,499,185 A | * | 3/1996 | Tanzer | H02J 7/0042 336/59 |
| 5,545,966 A | * | 8/1996 | Ramos | B60L 53/34 320/108 |
| 5,909,099 A | * | 6/1999 | Watanabe | A61K 31/728 320/108 |
| 6,220,955 B1 | * | 4/2001 | Posa | H05K 7/20154 62/396 |
| 6,396,241 B1 | * | 5/2002 | Ramos | B60L 53/11 320/108 |

(Continued)

*Primary Examiner* — Tho V Duong
*Assistant Examiner* — Raheena R Malik
(74) *Attorney, Agent, or Firm* — CALDWELL INTELLECTUAL PROPERTY LAW

(57) ABSTRACT

A method and system for ground-based thermal conditioning of an electric aircraft. The system includes an electric aircraft, an onboard thermal conditioning module on the electric aircraft, and a ground-based thermal conditioning module connected to the onboard thermal conditioning module. Liquid coolant runs through the ground-based thermal conditioning module to the onboard thermal conditioning module. Ground-based thermal conditioning module purges the coolant from the onboard thermal conditioning module. The ground-based thermal conditioning module is disconnected from the onboard thermal conditioning module.

20 Claims, 12 Drawing Sheets

(56) References Cited

U.S. PATENT DOCUMENTS

| | | | | |
|---|---|---|---|---|
| 8,098,044 | B2* | 1/2012 | Taguchi | B60L 53/302 320/109 |
| 8,174,235 | B2* | 5/2012 | Dyer | B60L 53/00 320/109 |
| 8,350,526 | B2* | 1/2013 | Dyer | B60L 53/16 320/109 |
| 9,197,292 | B2* | 11/2015 | Benjestorf | H04B 5/0093 |
| 9,233,618 | B2* | 1/2016 | Dyer | B60L 53/64 |
| 9,321,362 | B2* | 4/2016 | Woo | B60L 53/18 |
| 9,656,560 | B2* | 5/2017 | Lopez | B60L 58/24 |
| 9,701,210 | B2* | 7/2017 | Woo | B60L 53/11 |
| 9,786,961 | B2* | 10/2017 | Dyer | H01M 10/6557 |
| 10,076,058 | B2* | 9/2018 | Niizuma | H02J 50/70 |
| 10,377,264 | B2* | 8/2019 | Lopez | B60L 53/16 |
| 10,449,871 | B1* | 10/2019 | Lyon | B60L 53/14 |
| 10,497,996 | B1* | 12/2019 | Muniz | B60L 58/18 |
| 10,515,742 | B1* | 12/2019 | de Bock | B60L 53/14 |
| 10,717,367 | B1* | 7/2020 | Price | B60L 53/14 |
| 10,727,551 | B2 | 7/2020 | Muniz | |
| 10,903,535 | B2 | 1/2021 | Melack | |
| 11,440,427 | B1* | 9/2022 | Wiegman | B64F 1/36 |
| 11,447,030 | B1* | 9/2022 | Palombini | B60L 53/66 |
| 11,485,517 | B1* | 11/2022 | Wiegman | B64D 27/24 |
| 11,522,372 | B1* | 12/2022 | Wiegman | H02J 7/0029 |
| 11,572,183 | B1* | 2/2023 | Overfield | G08G 5/003 |
| 2009/0115251 | A1* | 5/2009 | Nakamura | B60K 6/365 180/65.29 |
| 2009/0273310 | A1* | 11/2009 | Flack | H01R 24/38 439/668 |
| 2010/0089669 | A1* | 4/2010 | Taguchi | B60L 58/15 180/65.1 |
| 2011/0175569 | A1* | 7/2011 | Austin | B60L 53/126 320/109 |
| 2011/0266996 | A1* | 11/2011 | Sugano | B60L 3/04 320/104 |
| 2012/0041855 | A1* | 2/2012 | Sterling | B60L 53/52 320/109 |
| 2012/0043935 | A1* | 2/2012 | Dyer | B60L 50/40 320/109 |
| 2013/0110296 | A1* | 5/2013 | Khoo | G06Q 10/1093 700/286 |
| 2013/0267115 | A1* | 10/2013 | Mark | B60L 53/18 439/485 |
| 2014/0062397 | A1* | 3/2014 | Dyer | B60L 53/665 320/109 |
| 2014/0292260 | A1* | 10/2014 | Dyer | B60L 53/65 320/137 |
| 2014/0347017 | A1* | 11/2014 | Sugano | B60L 53/122 320/137 |
| 2015/0102775 | A1* | 4/2015 | Von Novak, III | B60L 53/63 320/109 |
| 2015/0171646 | A1* | 6/2015 | Pham | H02J 7/007192 320/109 |
| 2015/0210175 | A1* | 7/2015 | Kang | B60L 53/305 320/109 |
| 2015/0217654 | A1* | 8/2015 | Woo | B60L 53/16 320/109 |
| 2016/0031338 | A1* | 2/2016 | Penilla | G06Q 20/18 320/109 |
| 2016/0052421 | A1* | 2/2016 | Galamb | B60L 53/302 165/47 |
| 2016/0121735 | A1* | 5/2016 | Sugano | H02J 7/342 320/109 |
| 2016/0137084 | A1* | 5/2016 | Shinada | H05K 7/20909 320/107 |
| 2016/0221458 | A1* | 8/2016 | Lopez | B60L 53/16 |
| 2016/0264012 | A1* | 9/2016 | Im | B60L 53/18 |
| 2016/0288653 | A1* | 10/2016 | Tsukamoto | B60L 53/66 |
| 2016/0375780 | A1* | 12/2016 | Penilla | G06Q 50/06 320/109 |
| 2017/0088005 | A1* | 3/2017 | Christen | B60L 53/14 |
| 2017/0144558 | A1* | 5/2017 | Remisch | B60L 53/302 |
| 2017/0243411 | A1* | 8/2017 | Gibeau | B60L 53/14 |
| 2017/0297431 | A1* | 10/2017 | Epstein | F02N 19/10 |
| 2017/0313205 | A1* | 11/2017 | Tseng | B60L 53/65 |
| 2018/0013180 | A1* | 1/2018 | Dyer | H01M 10/625 |
| 2019/0184849 | A1* | 6/2019 | Lim | B60L 53/18 |
| 2019/0385765 | A1* | 12/2019 | Lyon | B60L 53/16 |
| 2020/0080901 | A1* | 3/2020 | Myer | G01K 5/62 |
| 2020/0083701 | A1* | 3/2020 | Myer | G01K 5/52 |
| 2020/0171967 | A1* | 6/2020 | Gohla-Neudecker | B60L 58/26 |
| 2020/0277061 | A1 | 9/2020 | Becker | |

\* cited by examiner

METHODS AND SYSTEMS FOR GROUND-BASED THERMAL CONDITIONING FOR AN ELECTRIC AIRCRAFT

FIELD OF THE INVENTION

The present invention generally relates to the field of electric aircraft. In particular, the present invention is directed to a methods and systems for ground-based thermal conditioning for an electric aircraft.

BACKGROUND

Electric aircraft hold great promise in their ability to run using sustainably sourced energy without increase atmospheric carbon associated with burning of fossil fuels. Perennial downsides associated with electric aircraft include poor energy storage and recharging capabilities. Additionally, the thermal properties of any batteries on an electric aircraft must be controlled carefully to ensure optimal performance.

SUMMARY OF THE DISCLOSURE

In an aspect, a method for ground-based thermal conditioning for an electric aircraft includes fluidically connecting an onboard thermal conditioning module to a ground-based thermal conditioning module, pumping a liquid coolant through a thermal conditioning channel of the ground-based thermal conditioning module to a thermal conditioning channel of the onboard thermal conditioning module, purging the liquid coolant from the onboard thermal conditioning module, and disconnecting the aircraft from the ground-based thermal conditioning module.

In another aspect, a system for ground-based thermal conditioning for an electric aircraft includes an electric aircraft, an onboard thermal conditioning module fluidically connected to the electric aircraft, a ground based thermal conditioning module fluidically connected to the onboard thermal conditioning module, and a liquid coolant pumped through a thermal conditioning channel of the ground-based thermal conditioning module to a thermal conditioning channel of the onboard thermal conditioning module.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a ground-based thermal conditioning system and methods for regulating a temperature of an electric aircraft power supply during charging, thus facilitating safe and efficient fast recharging of an electric aircraft. In an embodiment, aspects relate specifically to a thermal conditioning system integrated into an electric aircraft that provides cooling to a power supply, such as a power source of an electric aircraft and corresponding electrical systems. For example, thermal conditioning system may include a coolant interface that delivers coolant to at least a battery of an electric aircraft during recharging of the battery. Moreover, thermal conditioning system may cool, or lower the temperature of, components of a power supply, such as contacts, cables, and/or ports of the power supply to prevent overheating of those elements during recharging as well. As it is generation of heat which prevents fast-charging of electric batteries, aspects of thermal conditioning system described herein provides an improvement of existing charging methods.

Aspects of the present disclosure also include a ground-based thermal conditioning module of the thermal conditioning system. Ground-based thermal conditioning module may include a spent coolant reservoir configured to store coolant from the electric aircraft.

Aspects of the present disclosure can be used to connect with communication, control, and/or sensor signals associated with an electric aircraft during charging, thereby allowing for monitoring of the charge and feedback control of various charging systems, such as, for example, power sources and coolant sources.

Figure 1:
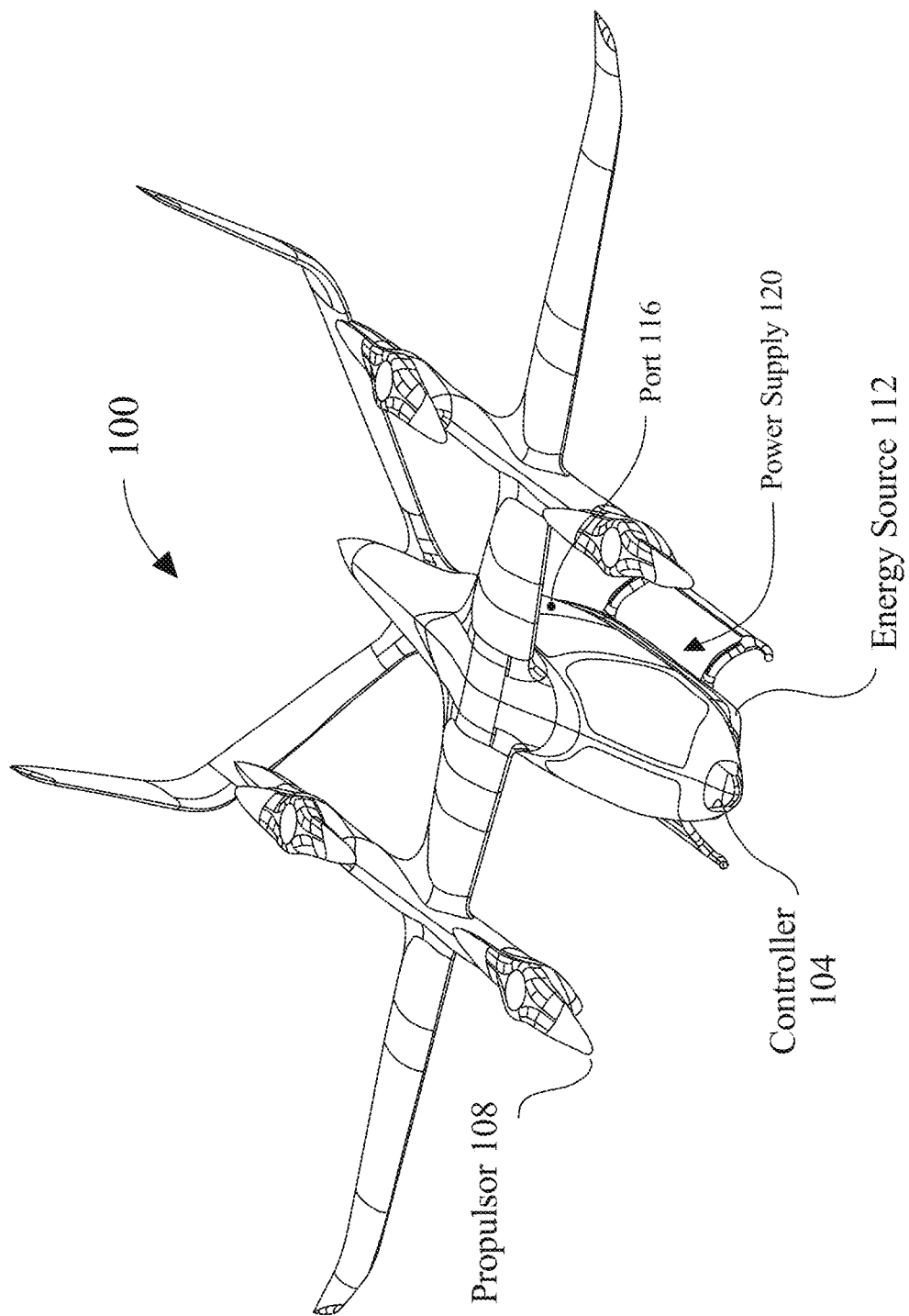
FIG. 1 is a schematic of an exemplary electric aircraft in accordance with one or more embodiments of the present disclosure.

Referring now to FIG. 1, an exemplary embodiment of an electric aircraft 100. Aircraft 100 includes a controller 104.

Controller 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Controller 104 may include a single computing device operating independently, or may include two or more computing device operating in concert, in parallel, sequentially or the like; two or more computing devices may be included together in a single computing device or in two or more computing devices. Controller 104 may interface or communicate with one or more additional devices as described below in further detail via a network interface device. Network interface device may be utilized for connecting controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. controller 104 may include but is not limited to, for example, a computing device or cluster of computing devices in a first location and a second computing device or cluster of computing devices in a second location. controller 104 may include one or more computing devices dedicated to data storage, security, distribution of traffic for load balancing, and the like. Controller 104 may distribute one or more computing tasks as described below across a plurality of computing devices of computing device, which may operate in parallel, in series, redundantly, or in any other manner used for distribution of tasks or memory between computing devices. controller 104 may be implemented using a "shared nothing" architecture in which data is cached at the worker, in an embodiment, this may enable scalability of system 100 and/or computing device.

With continued reference to FIG. 1, controller 104 may be designed and/or configured to perform any method, method step, or sequence of method steps in any embodiment described in this disclosure, in any order and with any degree of repetition. For instance, controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to reference FIG. 1, aircraft 100 may include an electrically powered aircraft (i.e., electric aircraft). In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. Aircraft 100 may include a propulsor 108 configured to generate lift on aircraft 100. A "propulsor," as used herein, is a component or device used to propel a craft by exerting force on a fluid medium, which may include a gaseous medium such as air or a liquid medium such as water. Propulsor 108 may be any device or component that propels an aircraft or other vehicle while on ground and/or in flight. Propulsor 108 may include one or more propulsive devices. Propulsor 108 may include a lift propulsor configured to create lift for aircraft. As used in this disclosure, "lift" is a force exerted on an aircraft that directly opposes the weight of the aircraft. In an embodiment, propulsor 108 may include a thrust element which may be integrated into the propulsor 108. As used in this disclosure, a "thrust element" is any device or component that converts mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, propulsor 108 may include a pusher propeller. Pusher propeller may be mounted behind the engine to ensure the drive shaft is in compression. Pusher propeller may include a plurality of blades, for example, two, three, four, five, six, seven, eight, or any other number of blades. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like. In an embodiment, propulsor 108 may include at least a blade. Persons skilled in the art, upon reviewing the entirety of this disclosure, will be aware of various devices that may be used as propulsor 108. In an embodiment, when a propulsor twists and pulls air behind it, it will, at the same time, push the aircraft with an equal amount of force. The more air pulled behind the aircraft, the more the aircraft is pushed forward. In an embodiment, thrust element may include a helicopter rotor incorporated into propulsor 108. A "helicopter rotor," as used herein, may include one or more blade or wing elements driven in a rotary motion to drive fluid medium in a direction axial to the rotation of the blade or wing element.

Its rotation is due to the interaction between the windings and magnetic fields which produces a torque around the rotor's axis. A helicopter rotor may include a plurality of blade or wing elements. Propulsor 108 may be substantially rigid and not susceptible to bending during flight. Therefore, in some embodiments, the blades of propulsor 108 may be rigid such that they are unable to feather. As used in this disclosure, a propulsor blade "feathers" when it changes its pitch. For example, for a blade that is configured to feather, forces exerted by a fluid on a moving vehicle when a propulsor is not rotating may cause the blade to adjust its pitch so the blade is parallel to the oncoming fluid.

With continued reference to FIG. 1, propulsor 108 may be a lift propulsor oriented such that propulsor plane is parallel with a ground when aircraft is landed. As used in this disclosure, a "propulsor plane" is a plane in which one or more propulsors rotate. Propulsor plane may generally be orthogonal to an axis of rotation, such as rotational axis A. For example, when aircraft is not traveling horizontally, propulsor plane may be orthogonal to rotational axis A. When there is a substantial force exerted on propulsor 108 that is orthogonal to rotational axis A, such as air resistance during edgewise flight, the force may cause significant stress and strain against propulsor 108. As used in this disclosure, "edgewise flight" is a flight orientation wherein an air stream is substantially directed at an edge of a lift propulsor. Edgewise flight may occur when an aircraft is traveling in a direction orthogonal to a rotational axis of a lift propulsor and parallel to a propulsor plane of the lift propulsor, causing an air stream to be directed at an edge of the lift propulsor. Edgewise flight may also occur when an aircraft is traveling in a direction in which a component of the velocity of the aircraft is in a direction orthogonal to a rotational axis of a lift propulsor and parallel to a propulsor plane of the lift propulsor. Additional forces, in addition to the air resistance, may also create significant stress and strain on propulsor 108. As a non-limiting example, as aircraft aircraft 100 travels in edgewise flight, propulsor 108 may rotate such that an advancing blade of the propulsor 108 is rotating forward and into incoming air, while a receding blade of the propulsor 108 is rotating backward and away from incoming air. As used in this disclosure, an "advancing blade" is a blade of a lift propulsor that is instantaneously moving substantially in the same direction as the aircraft's forward motion. As used in this disclosure, a "receding blade" is a blade of a lift propulsor that is instantaneously moving substantially in an opposite direction to the aircraft's forward motion. Because blades of propulsor 108 have airfoil cross sections, advancing blade produces greater lift than receding blade due to the relative motion of each of the blades relative to the oncoming air.

In another embodiment, and still referring to FIG. 1, propulsor 108 may include a propeller, a blade, or any combination of the two. A propeller may function to convert rotary motion from an engine or other power source into a swirling slipstream which may push the propeller forwards or backwards. Propulsor 108 may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referencing FIG. 1, aircraft 100 includes an energy source 112 that may be charged or recharged. As used in this disclosure, "charging" refers to a process of increasing energy stored within and energy source. In some cases, an energy source includes at least a battery and charging includes providing an electrical current to the at least a battery. As discussed further in this disclosure, a power supply may include an energy source 112, a charging port 116, and/or any other components necessary for transmitted power from charging port 116 to energy source 112. An energy source may be mounted to aircraft 100 and configured to provide an electrical charging current. As used in this disclosure, an "energy source" is a source of electrical power, such as, for example, for powering an electric aircraft. In some cases, energy source 112 may include a battery pack, as discussed further below. Energy source 112 may receive power from a charging battery of a charging station during charging of energy source 112 via an electrical charging current. As used in this disclosure, an "electrical charging current" is a flow of electrical charge that facilitates an increase in stored electrical energy of an energy storage, such as, and without limitation, a battery. Energy source 112 may include a plurality of batteries and/or battery packs, battery modules, and/or battery cells. Energy source 112 may house a variety of electrical components. In one embodiment, energy source 112 may include various cables, wires, circuits, and the like, for facilitating the transfer of power. In one or more embodiments, energy source 112 may be in electric communication with a port 116 of aircraft 100, as discussed further below in this disclosure. Energy source 112 and port 116 may be connected via an electrical conductor, such as a wire or cable. Exemplary conductor materials include metals, such as copper, nickel, steel, and the like. As used in this disclosure, "communication" is an attribute wherein two or more relata interact with one another, for example within a specific domain or in a certain manner. In some embodiments, communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "fluidic communication" is an attribute wherein two or more relata interact with one another by way of a fluidic flow or fluid in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

With continued reference to FIG. 1, power supply 120 may include a charging port 116 (also referred to in this disclosure as a "port") of aircraft 100. A connector of a charging station, such as charger or power grid, may connect to charging port 116 to provide power from charger through port 116 and to energy source 112. As used in this disclosure, a "connector" is a distal end of a tether or a bundle of tethers, e.g., hose, tubing, cables, wires, and the like, which is configured to removably attach with a mating component of a port of an electric aircraft. As used in this disclosure, a "port" is an interface configured to interact with another component and/or interface of a charger to allow a transmission of power between an energy source and the charger. For example, and without limitation, port 116 may interface with a number of conductors and/or a coolant flow path by way of receiving a connector. In other embodiments, port 116 may provide an interface between a signal and a computing device. A connector may include a male component having a penetrative form and port 116 may include a female component having a receptive form that is receptive to the male component. Alternatively or additionally, connector may have a female component and port 116 may have a male component. In some cases, connector may include multiple connections, which may make contact and/or communicate with associated mating components within port 116, when the connector is mated with port 116. As used in this disclosure, "mate" is an action of attaching two or more components together. Mating may be performed using an mechanical or electromechanical means. For example, without limitation mating may include an electromechanical device used to join electrical conductors and create an electrical circuit. In some cases, mating may be performed by way of gendered mating components. A gendered mate may include a male component or plug which is inserted within a female component or socket. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of a connector. In some cases, mate may be lockable. As used in this disclosure, an "electric aircraft" is any electrically power means of human transport, for example without limitation an electric aircraft or electric vertical take-off and landing aircraft. In some cases, an electric aircraft will include an energy source configured to power at least a motor configured to drive the propulsor 108 of aircraft 100.

Figure 2:
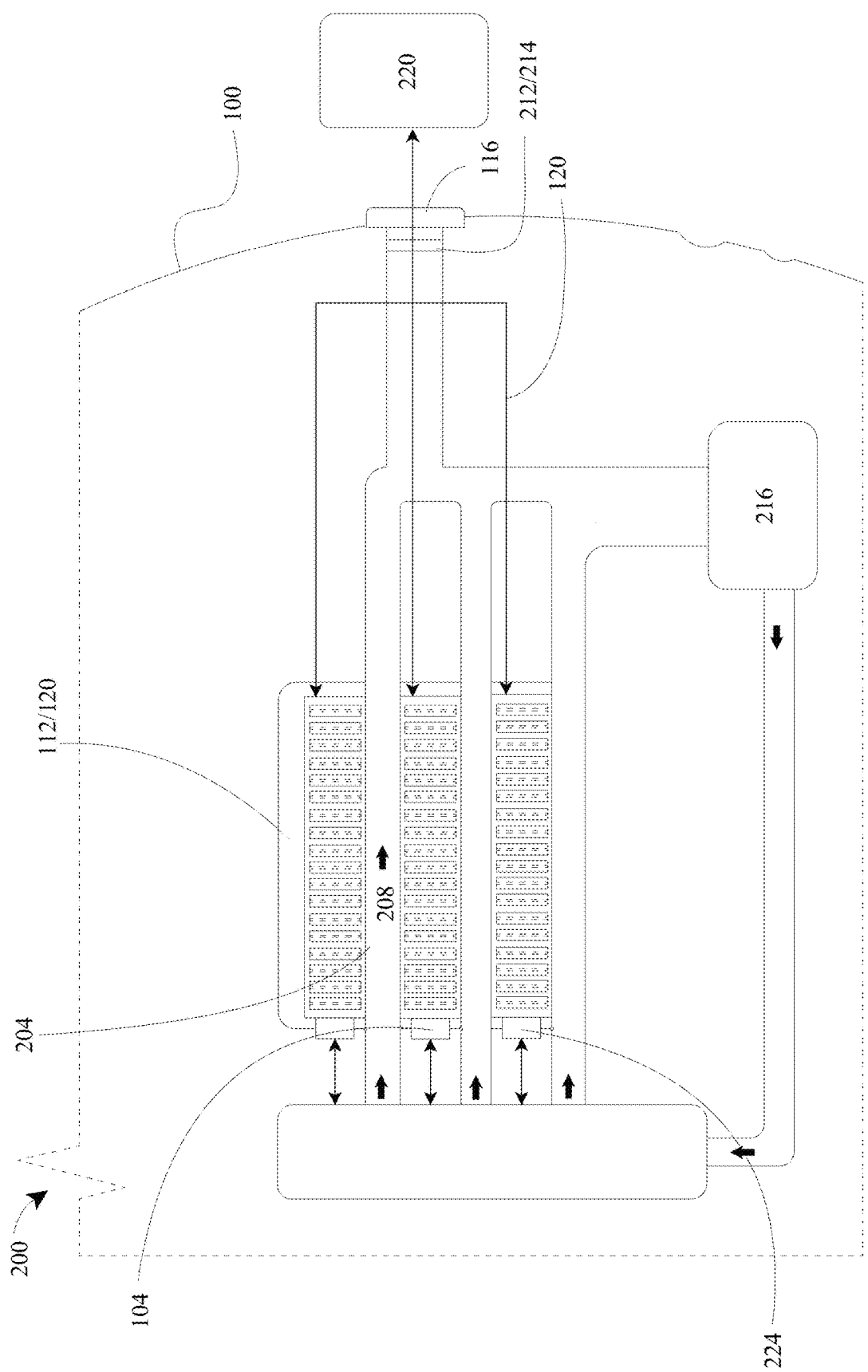
FIG. 2 is a depiction illustrating an embodiment of an onboard thermal conditioning module in accordance with one or more embodiments of the present disclosure.

Now referencing FIG. 2, an exemplary embodiment of an onboard thermal conditioning module 200 for aircraft 100. "Thermal conditioning", as used herein, is the act of transferring heat to or from (e.g., heating or cooling) an object. In an embodiment, thermal conditioning may include heating the power source before flying during cold weather situations. Onboard thermal conditioning module 200 (also referred to as 'module') includes a thermal conditioning channel 204, coolant flowing along a flow path 208, and a coolant cap 212. In one or more embodiments, system 100 includes a channel 204 extending throughout a power supply 120 of electric aircraft 100. Channel 204 is configured to contain a coolant that absorbs heat from the power source assembly during charging of a power source of the power source assembly. In one or more embodiments, channel 204 extends from energy source 112 to electric port 116 of the power supply. As used in this disclosure, a "channel" is a component that is substantially impermeable to a coolant and contains and/or directs a coolant flow, such as along a coolant flow path. In one or more embodiments, a coolant may include various types of fluids, such as propelene glycol, ethylene glycol, air, or water. Coolant may traverse along a flow path 208 within channel 204. For example, and without limitation, coolant may flow parallel to a longitudinal axis of channel 204. In one or more embodiments, channel 204 may include a duct, passage, tube, pipe, conduit, and the like. In one or more embodiments, channel 204 may be various shapes and sizes, for example, channel 204 may have a circular, triangular, rectangular, or any other shaped cross-section. Channel 204 may be composed of a rigid material or a flexible material. For example and without limitation, channel 204 may be composed of polypropylene, polycarbonate, acrylonitrile butadiene styrene, polyethylene, nylon, polystyrene, polyether ether ketone, and the like. Channel 204 may be composed of metals such as aluminum, titanium, steel or the like. Channel 204 may be composed of composites such as carbon fiber. In one or more embodiments, channel 204 may be arranged in a loop. For example, and without limitation, liquid traversing through channel 204 may repeatedly circulate through channel 204 and be reused as well as liquid may be traversed through channel 204 to a distal end of power supply then return to energy source 112 at the proximal end of power supply. For example, and without limitation, a coolant may be circulated unidirectionally through channel 204. In other embodiments, channel 204 may be a singular path. For example, ad without limitation, channel 204 may include a path that allows for a liquid to move bidirectionally through channel 204. In one or more embodiments, channel 204 may include a plurality of channels (as shown In FIG. 2). For example, and without limitation, one channel may bifurcate into two channels that are configured to be positioned at different locations along energy source 112 and/or components thereof. In another example, channel 204 may be a singular channel that, for example, forms a loop.

In one or more embodiments, channel 204 may include a passage that contains a coolant and allows the coolant to traverse therethrough. As used in this disclosure, "coolant" is any flowable heat transfer medium. Coolant may include a liquid. For example, and without limitation, coolant may be glycol or water, as previously mentioned. Coolant may include a compressible fluid and/or a non-compressible fluid. Coolant may include a non-electrically conductive liquid such as a fluorocarbon-based fluid, such as without limitation Fluorinert™ from 3M of Saint Paul, Minn., USA. As used in this disclosure, a "flow of coolant" is a fluid motion of a coolant, such as a stream of coolant. In one or more embodiments, channel 204 may be in fluidic communication with a coolant source of the ground-based thermal conditioning module shown in FIG. 3 and/or a heat exchanger 216, as discussed further below.

In one or more embodiments, channel 204 may abut power supply 120 so that coolant within channel 204 may absorb heat from power supply 120. For example, and without limitation, channel 204 may abut energy source 112 of power supply 120, which may be, for example, a battery, battery module, and/or battery pack. For instance, and without limitation, channel 204 may abut and run along a conductor of power supply 120 so as to regulate the temperature of various wires and cables of the electric communication between energy source 112 and port 116. In another instance, and without limitation, channel 204 may abut one or more components of port 116 to reduce a temperature of port 116 while conducting a current therethrough to transfer power to energy source 112 from a connected connector and/or charging station. In other embodiments, channel 204 may be partially open so that coolant may contact a component of power supply 120 and absorbed heat. Coolant may assist with rapid charging of the electric aircraft 100 by cooling down power supply and/or surrounding components.

Still referring to FIG. 2, module 200 may include a heat exchanger 216 configured to dissipate heat absorbed by a coolant. For the purposes of this disclosure, a "heat exchanger" is a component and/or system used to transfer thermal energy, such as heat, from one medium to another. For example, and without limitation, a heat exchanger may be a radiator. In one or more embodiments, heat exchanger 216 may be configured to transfer heat between a coolant and ambient air. As used in this disclosure, "ambient air" is air which is proximal a system and/or subsystem, for instance the air in an environment which a system and/or sub-system is operating. In one or more embodiments, heat exchanger 216 may include a cross-flow, parallel-flow, or counter-flow heat exchanger. In one or more embodiments, heat exchanger 216 may include a finned tube heat exchanger, a plate fin heat exchanger, a plate heat exchanger, a helical-coil heat exchanger, and the like. In other embodiments, heat exchanger 216 includes chillers, Peltier junctions, heat pumps, refrigeration, air conditioning, expansion or throttle valves, and the like, vapor-compression cycle system, vapor absorption cycle system, gas cycle system, Stirling engine, reverse Carnot cycle system, and the like.

In some embodiments, controller 104 may be further configured to control a temperature of coolant. For instance, in some cases, a sensor may be in thermal communication with coolant, such that sensor is able to detect, measure, or otherwise quantify a temperature of coolant. In some cases, sensor may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to a controller 104, as discussed further below in this disclosure. Controller 104 may receive coolant temperature signal and control heat transfer between ambient air and coolant as a function of the coolant temperature signal. Controller 104 may use any control method and/or algorithm used in this disclosure to control heat transfer, including without limitation proportional control, proportional-integral control, proportional-integral-derivative control, and the like. In some cases, controller 104 may be further configured to control temperature of coolant within a temperature range below an ambient air temperature. As used in this disclosure, an "ambient air temperature" is temperature of an ambient air. An exemplary non-limiting temperature range below ambient air temperature is about −5° C. to about −30° C. In some cases, coolant flow may have a rate within a specified range. A non-limiting exemplary coolant flow range may be about 0.1 CFM to about 100 CFM. In some cases, rate of coolant flow may be considered as a volumetric flow rate. Alternatively or additionally, rate of coolant flow may be considered as a velocity or flux. In one or more embodiments, heat exchanger 216 may cool, or lower the temperature, of coolant. For example, heat exchanger 216 may cool coolant to below an ambient air temperature. In some cases, coolant source and heat exchanger 216 may be powered by electricity, such as by way of one or more electric motors. Alternatively or additionally, coolant source and heat exchanger 216 may be powered by a combustion engine, for example a gasoline powered internal combustion engine. In one or more embodiments, coolant flow may be configured, such that heat transfer is facilitated between coolant and a battery, by any methods known and/or described in this disclosure. In some cases, coolant flow may be configured to facilitate heat transfer between the coolant flow and at least a conductor of electric aircraft, including, and without limitation, electrical busses connected to energy source 112.

Still referring to FIG. 2, in some embodiments, module 200 may additionally include a coolant flow path 208 being located proximal or otherwise in thermal communication with one or more conductors of power supply 120, for example direct current conductor and/or alternating current conductor. In some cases, heat generated within one or more conductors may be transferred into coolant within coolant flow path 208. In some cases, coolant flow path 208 may be arranged substantially coaxial with one or more conductors, such that coolant flows substantially parallel with an axis of the one or more conductors. Alternatively or additionally, in some cases, coolant flow path 208 may be arranged in cross flow with one or more conductors. In some cases, module 200 may include a heat exchanger 216 configured to extract heat from one or more conductors, for example at a location of high current and/or high impedance (e.g., resistance) within conductor. In some cases, generated heat within a conductor may be proportional to current within conductor squared. Heating within a conductor may be understood according to Joule heating, also referred to in this disclosure as resistive, resistance, or Ohmic heating. Joule-Lenz law states that power of heat generated by a conductor is proportional to a product of conductor resistance and a square of current within the conductor, see below.

$$P \propto I^2 R$$

where P is power of heat generated, for example in Watts, I is electric current within conductor, for example in Amps, and R is resistance of conductor, for example in Ohms. In some cases, coolant flow may be configured to provide a cooling load that is sufficient to cool at least a conductor of power supply 120 and one or more electric aircraft batteries during charging.

Still referring to FIG. 2, in some embodiments, one or more of at least a direct current conductor and at least an alternating current conductor on power supply 120 may be further configured to conduct a communication signal and/or control signal by way of power line communication. In some cases, controller 104 may be configured within communication of communication signal, for example by way of a power line communication modem. As used in this disclosure, "power line communication" is process of communicating at least a communication signal simultaneously with electrical power transmission. In some cases, power line communication may operate by adding a modulated carrier signal (e.g., communication signal) to a power conductor. Different types of power-line communications use different frequency bands. In some case, alternating current may have a frequency of about 50 or about 60 Hz. In some cases, power conductor may be shielded in order to prevent emissions of power line communication modulation frequencies. Alternatively or additionally, power line communication modulation frequency may be within a range unregulated by radio regulators, for example below about 500 KHz.

Still referring to FIG. 2, module 200 may include a controller 104. Controller may be consistent with any controller as discussed herein. In one or more embodiments, controller 104 may be communicatively connected to coolant source on the ground-based thermal conditioning module, coolant cap 212 on the onboard thermal conditioning module, and power supply 120 and configured to actuate coolant cap 212 based on information received regarding power supply 120.

In one or more embodiments, thermal conditioning of power supply 120 may be feedback controlled, by way of at least a sensor, and occur until or for a predetermined time after a certain condition has been met, such as, and without limitation, when at least energy source 112 is within a desired temperature range. In some non-limiting cases, controller 104 may use a machine-learning process to optimize cooling time relative of current charging metrics, for example energy source parameters and/or sensor signals. Controller 104 may utilize any machine-learning process described in this disclosure.

In one or more embodiments, controller 104 may generate or receive a control signal. For instance, and without imitation, controller 104 may transmit a control signal to, for example, pump via a communicative connection and/or informatic communication. For example, and without limitation, an informatic communication may include a control signal conductor configured to conduct a control signal. As used in this disclosure, a "control signal conductor" is a conductor configured to carry a control signal between an electric aircraft and a charger. As used in this disclosure, a "control signal" is an electrical signal that is indicative of information. In this disclosure, "control pilot" is used interchangeably in this application with control signal. In some cases, a control signal may include an analog signal or a digital signal. In some cases, control signal may be communicated from one or more sensors, for example located within electric aircraft (e.g., within an electric aircraft battery). For example, in some cases, control signal may be associated with a battery within an electric aircraft. For example, control signal may include a battery sensor signal. As used in this disclosure, a "battery sensor signal" is a signal representative of a characteristic of a battery. In some cases, battery sensor signal may be representative of a characteristic of an electric aircraft battery, for example as electric aircraft battery is being recharged. In some versions, controller 104 may additionally include a sensor interface configured to receive a battery sensor signal. Sensor interface may include one or more ports, an analog to digital converter, and the like. Controller 104 may be further configured to control one or more of electrical charging current and coolant flow as a function of battery sensor signal and/or control signal. For example, controller 104 may control coolant source and/or power supply 120 as a function of battery sensor signal and/or control signal. In some cases, battery sensor signal may be representative of battery temperature. In some cases, battery sensor signal may represent battery cell swell. In some cases, battery sensor signal may be representative of temperature of electric aircraft battery, for example temperature of one or more battery cells within an electric aircraft battery. In some cases, a sensor, a circuit, and/or a controller 104 may perform one or more signal processing steps on a signal. For instance, sensor, circuit or controller 104 may analyze, modify, and/or synthesize a signal in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

As used in this disclosure, a "controller" is a logic circuit, such as an application-specific integrated circuit (ASIC), FPGA, microcontroller, and/or computing device that is configured to control a subsystem. For example, controller 104 may be configured to control one or more of coolant source and/or energy source 112. In some embodiments controller may control coolant source and/or energy source 112 according to a control signal. As used in this disclosure, "control signal" is any transmission from controller to a subsystem that may affect performance of subsystem. In some embodiments, control signal may be analog. In some cases, control signal may be digital. Control signal may be communicated according to one or more communication protocols, for example without limitation Ethernet, universal asynchronous receiver-transmitter, and the like. In some cases, control signal may be a serial signal. In some cases, control signal may be a parallel signal. Control signal may be communicated by way of a network, for example a controller area network (CAN). In some cases, control signal may include commands to operate coolant source from the ground-based thermal conditioning module and/or energy source 112. For example, in some cases, module 200 may include a coolant cap 212 to control coolant flow through channel 204, and controller 104 may be configured to control the cap 212 by way of control signal. Coolant cap 212 may be a valve that can be opened or closed., for example, in response to a signal from controller 104. In some cases, coolant cap 212 may include an actuator 214 designed to open or close the cap 212. Controller 104 may be configured to control the flow of coolant through channel 204 by way of control signal.

With continued reference to FIG. 2, an actuator 214 may include a component of a machine that is responsible for moving and/or controlling a mechanism or system. An actuator 214 may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some cases, upon receiving a control signal, an actuator 214 responds by converting source power into mechanical motion. In some cases, an actuator 214 may be understood as a form of automation or automatic control.

With continued reference to FIG. 2, in some cases, actuator 214 may include an electric actuator. Electric actuator may include any of electromechanical actuators, linear motors, and the like. In some cases, actuator 214 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. electric actuator 214 may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may controlled be directly controlled by a control signal for controlling one or more linear motor parameters. Exemplary linear motor parameters include without limitation position, force, velocity, potential, and current.

With continued reference to FIG. 2, in some embodiments, an actuator 214 may include a mechanical actuator. In some cases, a mechanical actuator may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanism, including for example without limitation gears, rails, pulleys, cables, linkages, and the like.

In one or more embodiments, controller 104 may be configured to selectively engage and/or actuate coolant cap 212, for example turning coolant cap ON or OFF, by way of control signal. In one or more embodiments, a sensor may detect whether port 116 contains a connector 220 for the ground-based thermal conditioning module. In the case where there is no connector 220, actuator 214 may close the coolant cap 212. If sensor detects an object in the port 116, actuator 214 may be instructed to keep open or open the coolant cap 212. In one or more embodiments, controller 104 may be configured to control a coolant temperature setpoint or range by way of control signal. A coolant temperature setpoint or range may be inputted manually by a user, determined by controller 104 via machine-learning, or received from a database that includes data regarding acceptable temperatures for various types of power supplies. In some cases, energy source 112 may include electrical components configured to control flow of an electric recharging current or switches, relays, direct current to direct current (DC-DC) converters, and the like. In some case, energy source 112 may include one or more circuits configured to provide a variable current source to provide electric recharging current, for example an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few.

Still referring to FIG. 2, module 200 may include a sensor 224 connectively connected to controller 104 and power supply 120. In one or more embodiments, sensor 224 may be configured to: detect a characteristic of power supply 120. For instance, and without limitation, sensor 224 may be configured to determine a characteristic such as a charging state of energy source 112 and/or whether or not a connector 220 has mated to port 116. For example, and without limitation, sensor 224 may detect when a connector of a charger has engaged port 116 and is supplying power and/or coolant through port 116 to energy source 112. In another instance, and without limitation, sensor 224 may be configured to detect a characteristic of power supply 120 such as a temperature of energy source 112, port 116, and/or other components of power supply 120. In one or more embodiments, sensor 224 may be further configured to transmit a sensor signal related to the detected characteristic to controller 104 so that controller 104 is configured to actuate coolant source 144 in response to the received sensor signal. In some embodiments, sensor 224 may be located on electric aircraft 100, such as on energy source 112 or energy source 112. In other embodiments, sensor 224 may be remote to electric aircraft 100. The monitoring of a temperature of an energy source may be consistent with the battery monitoring and management disclosed in patent application Ser. No. 17/529,653, filed on Nov. 11, 2021 and titled "AN ELECTRIC AIRCRAFT BATTERY PACK AND METHODS OF USE", which is incorporated in this disclosure in its entirety.

In one or more embodiments, sensor 224 may include a proximity sensor, which may be configured to generate a proximity signal as a function of connection between connector 220 and port 116. As used in this disclosure, a "sensor" is a device that is configured to detect a physical phenomenon or characteristic and transmit information related to the detection. For example, in some cases, a sensor may transduce a detected phenomenon, such as without limitation temperature, pressure, current, voltage, motion, and the like, into a sensed signal (also referred to in this disclosure as a "sensor signal" or a "sensor output signal"). As used in this disclosure, a "proximity sensor" is a sensor that is configured to detect at least a phenomenon related to a component, such as a connector, of a charger being mated to a port of an electric aircraft. Sensor 224 may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In one or more embodiments, controller 104 may transmit a control signal, as previously mentioned, based on a received sensor signal. In one or more non-limiting embodiments, a proximity sensor may detect a physical separation between connector 220 and port 116 and, thus, generate a sensor signal that notifies controller 104 that a charging connection between connector 220 and electric aircraft 100 has been created or terminated as a function of the sensor signal.

In one or more embodiments, sensor 224 may detect a characteristic of power supply 120, such as an established charging connection between electric aircraft 100 and connector 220, a temperature of power supply 120 or component thereof, and the like. In one or more embodiments, sensor 224 may be configured to identify a communication of charging connection. For instance, and without limitation, sensor 224 may recognize that a charging connection has been created between connector 220 and electric aircraft 100 that facilitates communication between connector 220 and electric aircraft 100 and thus a transfer of power between connector 220 and energy source 112 of electric aircraft 100. Charging connection may also include the transfer of coolant between the connector 220 connected to the ground-based thermal conditioning module and port 116. For example, and without limitation, sensor 224 may identify a change in current through port 116, indicating port 116 is in electric communication with, for example, a connector of connector 220. For example, sensor 220 may identify a change in flow of coolant through port 116. Similarly, sensor 224 may identify that a charging connection and/or flow connection has been terminated between electric aircraft 100 and connector 220. For example, and without limitation, sensor 224 may detect that no current is flowing between electric aircraft 100 and connector 220. Additionally, sensor 224 may detect that no coolant is flowing between the electric aircraft 100 and connector 220. For the purposes of this disclosure, a "charging connection" is a connection associated with charging a power source, such as, for example, a battery of an electric aircraft. Charging connection may be a wired or wireless connection. Charging connection may include a communication between connector 220 and electric aircraft 100. For example, and without limitation, one or more communications between charger 108 and electric aircraft 100 may be facilitated by charging connection. As used in this disclosure, "communication" is an attribute where two or more relata interact with one another, for example, within a specific domain or in a certain manner. In some cases, communication between two or more relata may be of a specific domain, such as, and without limitation, electric communication, fluidic communication, informatic communication, mechanic communication, and the like. As used in this disclosure, "electric communication" is an attribute wherein two or more relata interact with one another by way of an electric current or electricity in general. For example, and without limitation, a communication between charger 108 and electric aircraft 100 may include an electric communication, where a current flows between charger 108 and electric aircraft 100. As used in this disclosure, "informatic communication" is an attribute wherein two or more relata interact with one another by way of an information flow or information in general. For example, an informatic communication may include a sensor of electric aircraft 100 or a remote device of electric aircraft 100 providing information to controller 104. As used in this disclosure, "mechanic communication" is an attribute wherein two or more relata interact with one another by way of mechanical means, for instance mechanic effort (e.g., force) and flow (e.g., velocity). For example, connector 220 may physically mate with port 116 to create a mechanic communication between electric aircraft 100 and connector 220.

In one or more embodiments, communication of charging connection may include various forms of communication. For example, and without limitation, an electrical contact without making physical contact, for example, by way of inductance, may be made between connector 220 and electric aircraft 100 to facilitate communication. Exemplary conductor materials include metals, such as without limitation copper, nickel, steel, and the like. In one or more embodiments, a contact of connector 220 may be configured to provide electric communication with a mating component within port 116 of electric aircraft 100. In one or more embodiments, contact may be configured to mate with an external connector. In one or more embodiments, connector may be positioned at a distal end of a tether or a bundle of tethers, e.g., hose, tubing, cables, wires, and the like, of connector 220, and connector may be configured to removably attach with a mating component, for example and without limitation, a port of electric aircraft 100. In one or more embodiments, port may include an interface configured to receive another component or an interface configured to transmit and/or receive signal on a computing device. For example, in the case of an electric aircraft port, the port interfaces with a number of conductors and/or a coolant flow paths by way of receiving a connector. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

In one or more embodiments, sensor 224 may include one or more sensors. Sensor 224 may detect a plurality of data about charging connection, electric aircraft 100, and/or connector 220. A plurality of data about, for example, charging connection may include, but is not limited to, battery quality, battery life cycle, remaining battery capacity, current, voltage, pressure, temperature, moisture level, and the like. In one or more embodiments, and without limitation, sensor 224 may include a plurality of sensors. In one or more embodiments, and without limitation, sensor 224 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 224 may be a contact or a non-contact sensor. For instance, and without limitation, sensor 224 may be connected to electric aircraft 100, connector 220, coolant cap 212, and/or a controller 104. In other embodiments, sensor 224 may be remote to electric aircraft 100, connector 220, coolant cap 212, and/or a controller 104. As discussed further in this disclosure below, controller 104 may include a computing device, a processor, a pilot control, a controller, control circuit, and the like. In one or more embodiments, sensor 224 may transmit/receive signals to/from controller 104. Signals may include electrical, electromagnetic, visual, audio, radio waves, or another undisclosed signal type alone or in combination.

In one or more embodiments, sensor 224 may include a plurality of independent sensors, where any number of the described sensors may be used to detect any number of physical or electrical quantities associated with communication of charging connection. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 224 to detect phenomenon may be maintained.

Still referring to FIG. 2, sensor 224 may include a motion sensor. A "motion sensor," for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 224 may include, torque sensor, gyroscope, accelerometer, torque sensor, magnetometer, inertial measurement unit (IMU), pressure sensor, force sensor, proximity sensor, displacement sensor, vibration sensor, among others. In some embodiments, sensor 224 may include a pressure sensor. A "pressure," for the purposes of this disclosure, and as would be appreciated by someone of ordinary skill in the art, is a measure of force required to stop a fluid from expanding and is usually stated in terms of force per unit area. In non-limiting exemplary embodiments, a pressure sensor may be configured to measure an atmospheric pressure and/or a change of atmospheric pressure. In some embodiments, a pressure sensor may include an absolute pressure sensor, a gauge pressure sensor, a vacuum pressure sensor, a differential pressure sensor, a sealed pressure sensor, and/or other unknown pressure sensors or alone or in a combination thereof. In some embodiments, the pressure sensor may be used to indirectly measure fluid flow, speed, water level, and altitude. In some embodiments, a pressure sensor may be configured to transform a pressure into an analogue electrical signal. In some embodiments, the pressure sensor may be configured to transform a pressure into a digital signal. In one or more embodiments, sensor 224 may detect a characteristic of connector 220 by detecting a pressure created by coolant flowing through channel 204 or a force exerted by coolant source of ground-based thermal conditioning module to move coolant through channel 204 and along a coolant path.

In one or more embodiments, sensor 224 may include electrical sensors. Electrical sensors may be configured to measure voltage across a component, electrical current through a component, and resistance of a component. In one or more embodiments, sensor 224 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 108, may be measured in Fahrenheit (° F.), Celsius (° C.), Kelvin (° K), or another scale alone or in combination. The temperature measured by sensors may comprise electrical signals, which are transmitted to their appropriate destination wireless or through a wired connection.

Figure 3:
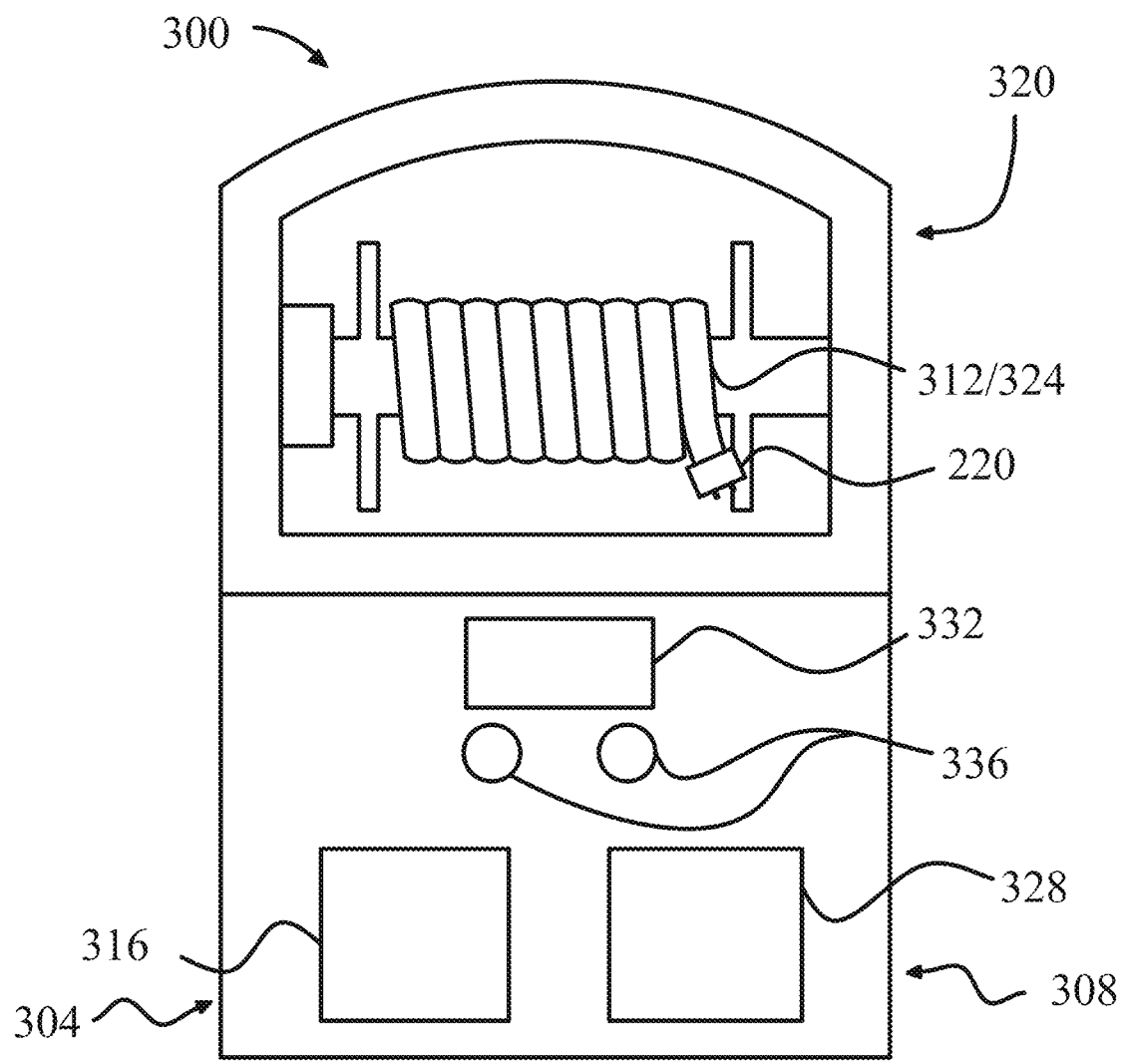
FIG. 3 is a depiction of an exemplary embodiment of a ground-based thermal conditioning module.

Now referring to FIG. 3, a ground-based thermal conditioning module 300 is illustrated. Module 300 may be split into a charging component 304 configured to charge a battery of the electric aircraft 100 and a thermal conditioning component 308 configured to cool a power supply of the aircraft 100. As used in this disclosure, a "charging component" is a device configured to charge a power supply. As used in this disclosure, a "thermal conditioning component" is a device configured to thermally condition a power supply and/or charging component. In some embodiments, thermal conditioning component 308 may be a cooling component. As used in this disclosure, a "cooling component" is a device configured to thermally condition a power supply and/or charging component. Charging component 304 and thermal conditioning component 308 may share a connector 220 such that one connector 220 may flow coolant and charge from module 300 to module 200. In some embodiments, charging component 304 and thermal conditioning component 308 may each have a separate connector 220. Connector 220 may fluidically connect onboard thermal conditioning module 200 to ground-based thermal conditioning module 300 such that module 200 and module 300 fluidically communicate. Ground-based thermal conditioning module 300 may include a connector 220, cable 312, energy source 316, controller 320, thermal conditioning channel 324, coolant source 328, and spent coolant reservoir 332. Ground service systems may be consistent with ground service systems in U.S. patent application Ser. No. 17/752,248 filed on May 24, 2022, and titled "GROUND SERVICE SYSTEMS AND DEVICES FOR AN ELECTRIC AIRCRAFT".

Continuing to reference FIG. 3, connector 220 may be connected to a cable 312 on ground-based thermal conditioning module 300. A "cable," for the purposes of this disclosure is a conductor or conductors adapted to carry fluids for the purpose of charging and cooling an electronic device, such as an electric aircraft and/or component thereof. Cable 312 is configured to carry electricity. Cable 312 is also configured to carry liquid coolant from module 300 to module 200. In some embodiments, charging cable 312 may include a charging connector 112 in which the charging cable 312 carries AC and/or DC power to charging connector 112. Charging connector 112 may be consistent with disclosure of charging connector in U.S. patent application Ser. No. 17/889,068, filed Aug. 16, 2022, and titled "A CONNECTOR FOR CHARGING AN ELECTRIC AIRCRAFT AND A METHOD FOR ITS USE." Charging cable 312 may include a coating, wherein the coating surrounds the conductor or conductors of charging cable 312. One of ordinary skill in the art, after having reviewed the entirety of this disclosure, would appreciate that a variety of coatings are suitable for use in charging cable 312. As a non-limiting example, the coating of charging cable 312 may comprise rubber. As another non-limiting example, the coating of charging cable 312 may comprise nylon. Charging cable 312 may be a variety of lengths depending on the length required by the specific implementation. As a non-limiting example, charging cable 312 may be 10 feet. As another non-limiting example, charging cable 312 may be 25 feet. As yet another non-limiting example, charging cable 312 may be 50 feet or any other length. Charging cable 312 may include, without limitation, a constant voltage charger, a constant current charger, a taper current charger, a pulsed current charger, a negative pulse charger, an IUI charger, a trickle charger, a float charger, a random charger, and the like, among others. Charging cable 312 may include any component configured to link an electric aircraft to the connector, charging connector 112 or charger. Charging cable 312 may be consistent with any charger disclosed in U.S. patent application Ser. No. 17/736,574, filed May 4, 2022, and titled "METHODS AND SYSTEMS FOR CHARGING AN ELECTRIC AIRCRAFT INCLUDING A HORIZONTAL CABLE ARRANGEMENT." Charging component 304 may be configured to charge battery in electric aircraft. Battery may be housed in electric aircraft. Battery may include, without limitation, a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Charging component 304 may be consistent with disclosure of one or more features of electric aircraft charging system described in in U.S. patent application Ser. No. 17/736,530, filed May 4, 2022, and titled "A SYSTEM FOR AN ELECTRIC AIRCRAFT CHARGING WITH A CABLE REEL."

Still referring to FIG. 3, charging cable 312 may be electrically connected to an energy source 316. "Electrically connected," for the purposes of this disclosure, means a connection such that electricity can be transferred over the connection. Charging component 304 may be in contact with the ground. In some embodiments, charging component 304 may be fixed to another structure. Energy source 316 may be consistent with any energy source as described herein. Energy source 316 need not be made up of only a single electrochemical cell, it can consist of several electrochemical cells wired in series or in parallel. In other embodiments, energy source 316 may be a connection to the power grid. For example, in some non-limiting embodiments, energy source 316 may include a connection to a grid power component. Grid power component may be connected to an external electrical power grid. In some other embodiments, the external power grid may be used to charge batteries, for example, when energy source 316 includes batteries. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. Some components of system 100 may be consistent with the charger disclosed in U.S. application Ser. No. 17/477,987 filed on Sep. 17, 2021, titled "SYSTEMS AND METHODS FOR ADAPTIVE ELECTRIC AIRCRAFT," the entirety of which is hereby incorporated by reference.

Continuing to reference FIG. 3, connector 220 may include a variety of pins adapted to mate with port 116, discussed above. Pins may include direct current pin, used to provide direct current (DC) to the aircraft, alternating current (AC) pin, ground pin, and cooling pin. "DC power," for the purposes of this disclosure refers, to a one-directional flow of charge. For example, in some embodiments, DC pin may supply power with a constant current and voltage. For the purposes of this disclosure, "AC power" refers to electrical power provided with a bi-directional flow of charge, where the flow of charge is periodically reversed. AC pin may supply AC power at a variety of frequencies. For the purpose of this disclosure, "ground" is the reference point from which all voltages for a circuit are measured. "Ground" can include both a connection the earth, or a chassis ground, where all of the metallic parts in a device are electrically connected together. In some embodiments, "ground" can be a floating ground. Ground may alternatively or additionally refer to a "common" channel or "return" channel in some electronic systems. For the purposes of this disclosure, "cooling pin" is a connection between thermal conditioning channels, such as the thermal conditioning channels of the onboard thermal conditioning module and the ground-based thermal conditioning module. Pins may include mating components. As used in this disclosure, a "mating component" is a component that is configured to mate with at least another component, for example in a certain (i.e. mated) configuration. For the purposes of this disclosure, a "pin" may be any type of electrical connector. An electrical connector is a device used to join electrical conductors to create a circuit. As a non-limiting example, in some embodiments, any pin of connector 220 may be the male component of a pin and socket connector. In other embodiments, any pin of connector 220 may be the female component of a pin and socket connector. As a further example of an embodiment, a pin may have a keying component. A keying component is a part of an electrical connector that prevents the electrical connector components from mating in an incorrect orientation. As a non-limiting example, this can be accomplished by making the male and female components of an electrical connector asymmetrical. Additionally, in some embodiments, a pin, or multiple pins, of connector 220 may include a locking mechanism. For instance, as a non-limiting example, any pin of charging connector 112 may include a locking mechanism to lock the pins in place. The pin or pins of connector 220 may each be any type of the various types of electrical connectors disclosed above, or they could all be the same type of electrical connector. One of ordinary skill in the art, after reviewing the entirety of this disclosure, would understand that a wide variety of electrical connectors may be suitable for this application.

Still referring to FIG. 3, module 300 may include a controller 320, consistent with any controller as discussed herein. Controller 320 may be communicatively connected to a sensor on module 300, discussed in further detail below. Connector 220 may include a communication pin. A "communication pin", as used herein, is an electric connector configured to carry electric signals between components of module 300 and components of an electric aircraft. As a non-limiting example, communication pin may carry signals from a controller in a charging system to a controller onboard an electric aircraft such as a flight controller or battery management controller. A person of ordinary skill in the art would recognize, after having reviewed the entirety of this disclosure, that communication pin could be used to carry a variety of signals between components.

Still referring to FIG. 3, module 300 may include a thermal conditioning component 308 configured to regulate a temperature of battery of electric aircraft. As used in this disclosure, a Thermal conditioning component 308 may include a thermal conditioning channel 324 through which a coolant may flow. Thermal conditioning channel 324 may be of any length including, without limitation, ten feet, twenty-five feet, or fifty feet long. A distal end of thermal conditioning channel 324 may connect to a connector 220. Connector 220 may be configured to connect to battery in electric aircraft, a battery thermal conditioning system in electric aircraft, an outer surface of the electric aircraft such as a thermal conditioning port, and/or a compartment within electric aircraft that stores the battery such as a battery bay. As used in this disclosure, a thermal conditioning channel "connected to" a component and/or space means that the thermal conditioning channel forms a fluid connection to the component and/or space. Thermal conditioning component 308 may include a cooling control 336 configured to control a flow of coolant through thermal conditioning channel 324. Cooling control 336 may include a control panel. Cooling control 336 may include buttons, switches, slides, a touchscreen, joystick, and the like. In some embodiments, cooling control 336 may include a screen that displays information related to the cooling of battery and/or temperature of battery. For example, and without limitation, screen may display a rate of flow of coolant through thermal conditioning channel 324, a temperature of coolant, and/or a temperature of battery being charged. In an exemplary embodiment, a user may actuate, for example, a switch, of cooling control 332 to initiate a cooling of electric aircraft in response to displayed information and/or data on screen of connector 220. Initiating of a cooling of connector 220 may include a coolant source displacing a coolant within thermal conditioning channel, as discussed further in this disclosure below. Thermal conditioning component 308 may include and/or be connected to a coolant source 328 configured to store coolant and from which coolant may flow through thermal conditioning channel 324.

Thermal conditioning channel 324 may have a distal end located at connector 220 and may have a proximal end located at a coolant source 328, as discussed further below in this disclosure. Thermal conditioning channel 324 may solely cool (e.g., reduce a current temperature) connector 220 such that the coolant flows through or next to the cables within the connector 220. For example, and without limitation, thermal conditioning channel may reduce the temperature of one or more conductors of connector 220. Thermal conditioning channel 324 may include a loop through which coolant may flow. Loop may include a flow of cooled coolant from coolant source 328 to distal end of the thermal conditioning channel 324 and a return flow of warmer coolant from the distal end to the coolant source 328 wherein coolant may be cooled. Thermal conditioning channel 324 may include any component, such as a cooling sensor, responsible for transmitting signals describing a cooling of battery and/or connector 220, such as current temperature, target temperature, and/or target range temperature of battery, charging connector 112, and/or coolant in coolant source 328. Cooling sensor may include at least a temperature sensor. Temperature senor may include a thermocouple, thermistors, negative temperature coefficient (NTC) thermistors, resistance temperature detectors (RTDs) and the like. Thermal conditioning channel 324 may assist in rapid charging of an energy source of electric aircraft such that coolant assists in cooling down the electrical components to aid in faster charging. Flow of coolant through thermal conditioning channel 324 may be initiated by controller 320. Controller 320 may control pump based on measurements by cooling sensor described in this disclosure. Controller 320 may initiate and/or terminate a flow of coolant through thermal conditioning channels 320 as a function of detected data by a sensor such as a charging sensor, cooling sensor, and/or a sensor of electric aircraft, as discussed further below in this disclosure. Thermal conditioning component 308 may include a pump configured to control a flow of coolant from coolant source 328 through thermal conditioning channel 324 to a thermal conditioning channel 204 of onboard thermal conditioning module 200. Controller 320 may be configured to control pump. For example, controller 320 may be configured to start pump, stop pump, and/or control a flow rate of coolant. Pump may include a substantially constant pressure pump (e.g., centrifugal pump) or a substantially constant flow pump (e.g., positive displacement pump, gear pump, and the like). Pump may be hydrostatic or hydrodynamic. As used in this disclosure, a "pump" is a mechanical source of power that converts mechanical power into fluidic energy. A pump may generate flow with enough power to overcome pressure induced by a load at a pump outlet. A pump may generate a vacuum at a pump inlet, thereby forcing fluid from a reservoir into the pump inlet to the pump and by mechanical action delivering this fluid to a pump outlet. Hydrostatic pumps are positive displacement pumps. Hydrodynamic pumps can be fixed displacement pumps, in which displacement may not be adjusted, or variable displacement pumps, in which the displacement may be adjusted. Exemplary non-limiting pumps include gear pumps, rotary vane pumps, screw pumps, bent axis pumps, inline axial piston pumps, radial piston pumps, and the like. Pump may be powered by any rotational mechanical work source, for example without limitation and electric motor or a power take off from an engine. Pump may be in fluidic communication with at least a reservoir. In some cases, reservoir may be unpressurized and/or vented. Alternatively, reservoir may be pressurized and/or sealed. Pump may be in fluidic communication with port 116 of electric aircraft 100 such that pump may control flow of coolant between the onboard thermal conditioning module 200 and the ground-based thermal conditioning module 300.

Cooling sensor may be included in thermal conditioning component 308. Cooling sensor may be in electric aircraft and communicatively connected to thermal conditioning component 308. Cooling sensor may include a plurality of sensors. In some embodiments, thermal conditioning component 308 may be configured to heat cable 312 and/or battery. For example, thermal conditioning component 308 may include at least a heater and/or at least a heating pad to heat coolant and/or directly heat cable 312. A heated coolant may flow through cable 312 and/or battery in any manner described in this disclosure related to cooling the cable 312 and/or the battery.

Still referring to FIG. 3, thermal conditioning channel 324 may be in fluidic communication with coolant source 328. As used in this disclosure, a "coolant source" is an origin, generator, reservoir, or flow producer of coolant. In some cases, a coolant source 328 may include a flow producer, such as a fan and/or a pump. Coolant source 328 may include any of following non-limiting examples, air conditioner, refrigerator, heat exchanger, pump, fan, expansion valve, and the like. In some embodiments, coolant source 328 may be further configured to transfer heat between coolant, for example coolant belonging to coolant flow, and an ambient air. As used in this disclosure, "ambient air" is air which is proximal a system and/or subsystem, for instance the air in an environment which a system and/or sub-system is operating. For example, in some cases, coolant source 328 comprises a heat transfer device between coolant and ambient air. Exemplary heat transfer devices include, without limitation, chillers, Peltier junctions, heat pumps, refrigeration, air conditioning, expansion or throttle valves, heat exchangers (air-to-air heat exchangers, air-to-liquid heat exchangers, shell-tube heat exchangers, and the like), vapor-compression cycle system, vapor absorption cycle system, gas cycle system, Stirling engine, reverse Carnot cycle system, and the like. In some versions, controller 320 may be further configured to control a temperature of coolant in cooling cable. For instance, in some cases, cooling sensor may be located within thermal communication with coolant, such that cooling sensor is able to detect, measure, or otherwise quantify temperature of coolant within a certain acceptable level of precision. In some cases, cooling sensor 76 may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to controller 320. Controller 320 may receive coolant temperature signal and control heat transfer between ambient air and coolant as a function of the coolant temperature signal. Controller 320 may use any control method and/or algorithm used in this disclosure to control heat transfer, including without limitation proportional control, proportional-integral control, proportional-integral-derivative control, and the like. In some cases, controller 320 may be further configured to control temperature of coolant within a temperature range below an ambient air temperature. As used in this disclosure, an "ambient air temperature" is temperature of an ambient air. An exemplary non-limiting temperature range below ambient air temperature is about −5° C. to about −30° C. In some embodiments, coolant flow may substantially be comprised of air. In some cases, coolant flow may have a rate within a range a specified range. A non-limiting exemplary coolant flow range may be about 0.1 CFM and about 100 CFM. In some cases, rate of coolant flow may be considered as a volumetric flow rate. Alternatively or additionally, rate of coolant flow may be considered as a velocity or flux. In some embodiments, coolant source 328 may be further configured to transfer heat between a heat source, such as without limitation ambient air or chemical energy, such as by way of combustion, and coolant, for example coolant flow. In some cases, coolant source 328 may heat coolant, for example above ambient air temperature, and/or cool coolant, for example below an ambient air temperature. In some cases, coolant source 328 may be powered by electricity, such as by way of one or more electric motors. Alternatively or additionally, coolant source 328 may be powered by a combustion engine, for example a gasoline powered internal combustion engine. In some cases, coolant flow may be configured, such that heat transfer is facilitated between coolant flow and at least a battery, by any methods known and/or described in this disclosure. In some cases, at least a battery may include a plurality of pouch cells. In some cases, heat is transferred between coolant flow and one or more components of at least a pouch cell, including without limitation electrical tabs, pouch and the like. In some cases, coolant flow may be configured to facilitate heat transfer between the coolant flow and at least a conductor of electric aircraft, including without limitation electrical buses within at least a battery.

Still referring to FIG. 3, in some embodiments, cooling using coolant source 328 may occur synchronously and/or asynchronously with charging. For example, in some case, coolant source 328 may be configured to provide a flow of coolant prior to charging battery of electric aircraft. In some embodiments, thermal conditioning channel 324 may facilitate fluidic and/or thermal communication with coolant source 328 and at least a battery when connector is connected to a port of electric aircraft, such as a thermal conditioning port or cooling port. Alternatively and/or additionally, thermal conditioning channel 324 may facilitate fluidic and/or thermal communication with coolant source 328 and a cabin and/or cargo-space of aircraft when connector 220 is connected to thermal conditioning port. In some cases, a plurality of thermal conditioning channels, coolant sources, and/or connectors may be used to connect to multiple components of an electric aircraft. In some cases, coolant source 328 may pre-condition at least a vehicle battery. As used in this disclosure, "pre-conditioning" is an act of affecting a characteristic of a battery, for example battery temperature, pressure, humidity, swell, and the like, substantially prior to charging. For example and without limitation, coolant source 328 may be configured to pre-condition at least a battery prior to charging, by providing a coolant flow to the at least a battery and raising and/or lowering temperature of the at least a battery. As a further non-limiting example, pre-conditioning may occur for a predetermined time prior to charging (e.g., 1 min, 10 min, 1 hour, 4 hours, and the like). Alternatively or additionally, pre-conditioning may be feedback controlled, by way of at least a charging sensor, and occur until or for a predetermined time after a certain condition has been met, such as without limitation when at least a battery is within a desired temperature range. In some cases, coolant source 328 may be configured to pre-condition any space or component within a vehicle, such as an aircraft, including without limitation cargo space and cabin. In some cases, and without limitation, coolant source 328 may provide cooling to at least a battery after charging the at least a battery. In some cases, and without limitation, at least a machine-learning process may be used to determine and/or optimize parameters associated with cooling of at least a battery. In some non-limiting cases, controller 320 may use at least a machine-learning process to optimize cooling time relative of current charging metrics, for example charging battery parameters and/or charging sensor signals. Coolant source 328 may include any computing device described in this disclosure.

Continuing to reference FIG. 3, module 300 may include a spent coolant reservoir. As used herein, a "spent coolant reservoir" is a place where used coolant from the aircraft is collected. Spent coolant reservoir 332 may be a container made of nonporous, nonreactive materials such as plastics or metals. Spent coolant reservoir 332 may be located within module 300 or separately from module 300. Spent coolant reservoir 332 may be fluidically connected to module 300 and indirectly connected to aircraft 100. Spent coolant reservoir 332 may be used to store coolant purged from the onboard thermal conditioning module 200. In an embodiment, coolant may be purged from module 200 after the completion of charging of aircraft 100, or at the request of a user. Additionally, coolant may be purged after battery reaches a predetermined temperature. Controller 320 may activate a pump configured to purge coolant from the aircraft 100 before controller 104, onboard the aircraft, activates an actuator configured to close the coolant cap 212. As used herein, "purging the coolant" refers to purging the coolant in the onboard thermal conditioning module 200 that is transferred from the ground-based thermal conditioning module 300. In an embodiment, aircraft 100 and/or power supply 120 may contain coolant that does not flow through thermal conditioning channel 204 or thermal conditioning channel 324. Other coolant found in the aircraft and/or the power source may not be purged. "Purging the coolant" does not require that literally all of the coolant is purged from onboard thermal conditioning module 200; instead, coolant may be considered to be purged even when, for example, trace amounts remain. Coolant in spent coolant reservoir 332 may be recycled back into the electric aircraft 100 and reused. In an embodiment, coolant in spent coolant reservoir 332 may be moved into the coolant source 328 and reused. After the purging of coolant from the electric aircraft, aircraft 100 may be disconnected from the connector 220, therefore disconnecting the ground-based thermal conditioning module 300 from the onboard thermal conditioning module 200.

Continuing to reference FIG. 3, purging the liquid coolant may include replacing a first fluid with a second fluid. In an embodiment, liquid coolant may be pumped out of the onboard thermal conditioning module 200 and a second fluid may be pumped into the onboard thermal conditioning module 200 before coolant cap 212 is closed. Second fluid may be stored in module 300 before being pumped into module 200. In an embodiment, second fluid may remain in the aircraft after ground-based thermal conditioning module 300 is disconnected. Second fluid may include any fluid such as air, coolant, oil, wax, or the like. In some embodiments, wax may be inputted into module 200 as it may store energy as the batteries heat. In some embodiments, inputting wax into module 200 may be part of purging the liquid coolant.

Figure 4:
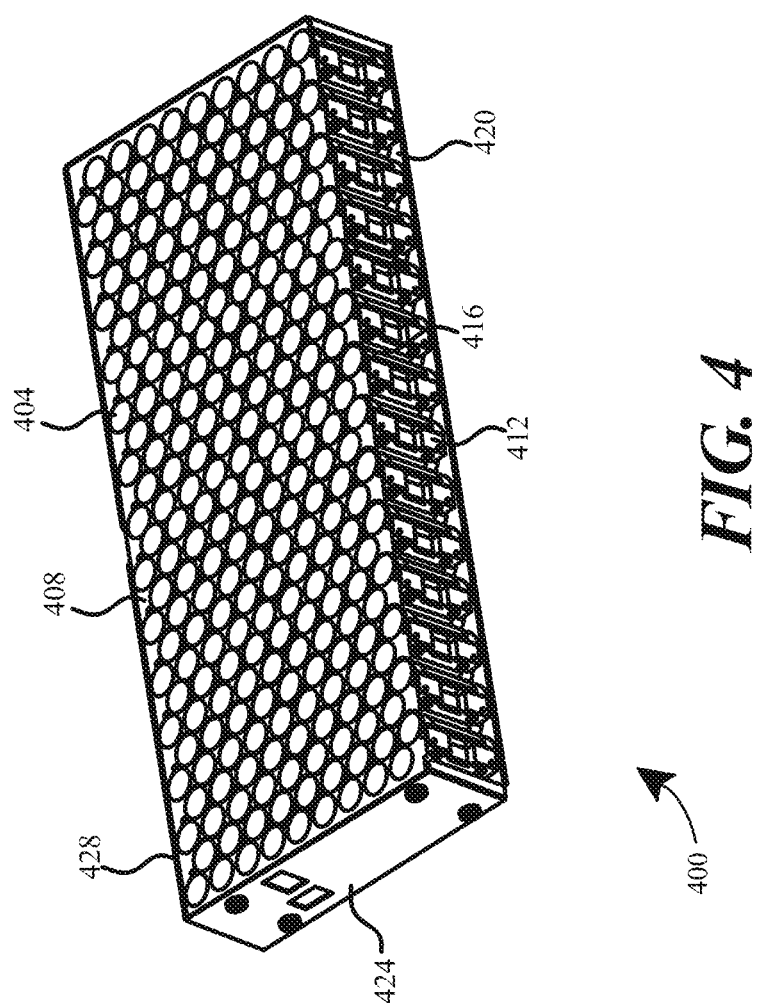
FIG. 4 schematically illustrates an exemplary battery module in accordance with one or more embodiments of the present disclosure.

Referring now to FIG. 4, an exemplary component of an electric aircraft energy source is illustrated. An energy source may include a battery that may include a battery or module. For example, and without limitation a battery may include a plurality of battery modules. As shown in FIG. 4, battery module 400 may include multiple battery units 416 is illustrated, according to embodiments. Battery module 400 may comprise a battery cell 404, cell retainer 408, cell guide 412, protective wrapping, back plate 420, end cap 424, and side panel 428. Battery module 400 may comprise a plurality of battery cells, an individual of which is labeled 404. In embodiments, battery cells 404 may be disposed and/or arranged within a respective battery unit 416 in groupings of any number of columns and rows. For example, in the illustrative embodiment of FIG. 4, battery cells 404 are arranged in each respective battery unit 416 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 4 battery cells 404 are arranged 18 to battery unit 416 with a plurality of battery units 416 comprising battery module 400, one of skill in the art will understand that battery cells 404 may be arranged in any number to a row and in any number of columns and further, any number of battery units may be present in battery module 400. According to embodiments, battery cells 404 within a first column may be disposed and/or arranged such that they are staggered relative to battery cells 404 within a second column. In this way, any two adjacent rows of battery cells 404 may not be laterally adjacent but instead may be respectively offset a predetermined distance. In embodiments, any two adjacent rows of battery cells 404 may be offset by a distance equal to a radius of a battery cell. This arrangement of battery cells 404 is only a non-limiting example and in no way preclude other arrangement of battery cells.

In embodiments, battery cells 404 may be fixed in position by cell retainer 408. For the illustrative purposed within FIG. 4, cell retainer 408 is depicted as the negative space between the circles representing battery cells 404. Cell retainer 408 comprises a sheet further comprising circular openings that correspond to the cross-sectional area of an individual battery cell 404. Cell retainer 408 comprises an arrangement of openings that inform the arrangement of battery cells 404. In embodiments, cell retainer 408 may be configured to non-permanently, mechanically couple to a first end of battery cell 404.

According to embodiments, battery module 400 may further comprise a plurality of cell guides 412 corresponding to each battery unit 416. Cell guide 412 may comprise a solid extrusion with cutouts (e.g. scalloped) corresponding to the radius of the cylindrical battery cell 404. Cell guide 412 may be positioned between the two columns of a battery unit 416 such that it forms a surface (e.g. side surface) of the battery unit 416. In embodiments, the number of cell guides 412 therefore match in quantity to the number of battery units 416. Cell guide 412 may comprise a material suitable for conducting heat.

Battery module 400 may also comprise a protective wrapping woven between the plurality of battery cells 404. Protective wrapping may provide fire protection, thermal containment, and thermal runaway during a battery cell malfunction or within normal operating limits of one or more battery cells 404 and/or potentially, battery module 400 as a whole. Battery module 400 may also comprise a backplate 420. Backplate 420 is configured to provide structure and encapsulate at least a portion of battery cells 404, cell retainers 408, cell guides 412, and protective wraps. End cap 424 may be configured to encapsulate at least a portion of battery cells 404, cell retainers 408, cell guides 412, and battery units 416, as will be discussed further below, end cap may comprise a protruding boss that clicks into receivers in both ends of back plate 420, as well as a similar boss on a second end that clicks into sense board. Side panel 428 may provide another structural element with two opposite and opposing faces and further configured to encapsulate at least a portion of battery cells 404, cell retainers 408, cell guides 412, and battery units 416.

Still referring to FIG. 4, in embodiments, battery module 400 can include one or more battery cells 404. In another embodiment, battery module 400 comprises a plurality of individual battery cells 404. Battery cells 404 may each comprise a cell configured to include an electrochemical reaction that produces electrical energy sufficient to power at least a portion of an electric aircraft and/or a cart 100. Battery cell 404 may include electrochemical cells, galvanic cells, electrolytic cells, fuel cells, flow cells, voltaic cells, or any combination thereof—to name a few. In embodiments, battery cells 404 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 404 may use the term 'wired', but one of ordinary skill in the art would appreciate that this term is synonymous with 'electrically connected', and that there are many ways to couple electrical elements like battery cells 404 together. As an example, battery cells 404 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 404 may be wired in a series-parallel circuit which combines characteristics of the constituent circuit types to this combination circuit. Battery cells 404 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

According to embodiments and as discussed above, any two rows of battery cells 404 and therefore cell retainer 408 openings are shifted one half-length so that no two battery cells 404 are directly next to the next along the length of the battery module 400, this is the staggered arrangement presented in the illustrated embodiment of FIG. 4. Cell retainer 408 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 408 may comprise staggered openings that align with battery cells 404 and further configured to hold battery cells 404 in fixed positions. Cell retainer 408 may comprise an injection molded component. Injection molded component may comprise a component manufactured by injecting a liquid into a mold and letting it solidify, taking the shape of the mold in its hardened form. Cell retainer 408 may comprise liquid crystal polymer, polypropylene, polycarbonate, acrylonitrile butadiene styrene, polyethylene, nylon, polystyrene, polyether ether ketone, to name a few. Cell retainer 408 may comprise a second cell retainer fixed to the second end of battery cells 404 and configured to hold battery cells 404 in place from both ends. The second cell retainer may comprise similar or the exact same characteristics and functions of first cell retainer 408. Battery module 400 may also comprise cell guide 412. Cell guide 412 includes material disposed in between two rows of battery cells 404. In embodiments, cell guide 412 can be configured to distribute heat that may be generated by battery cells 404.

According to embodiments, battery module 400 may also comprise back plate 420. Back plate 420 is configured to provide a base structure for battery module 400 and may encapsulate at least a portion thereof. Backplate 420 can have any shape and includes opposite, opposing sides with a thickness between them. In embodiments, back plate 420 may comprise an effectively flat, rectangular prism shaped sheet. For example, back plate 420 can comprise one side of a larger rectangular prism which characterizes the shape of battery module 400 as a whole. Back plate 420 also comprises openings correlating to each battery cell 404 of the plurality of battery cells 404. Back plate 420 may comprise a lamination of multiple layers. The layers that are laminated together may comprise FR-4, a glass-reinforced epoxy laminate material, and a thermal barrier of a similar or exact same type as disclosed hereinabove. Back plate 420 may be configured to provide structural support and containment of at least a portion of battery module 400 as well as provide fire and thermal protection.

According to embodiments, battery module 400 may also comprise first end cap 424 configured to encapsulate at least a portion of battery module 400. End cap 424 may provide structural support for battery module 400 and hold back plate 420 in a fixed relative position compared to the overall battery module 400. End cap 424 may comprise a protruding boss on a first end that mates up with and snaps into a receiving feature on a first end of back plate 420. End cap 424 may comprise a second protruding boss on a second end that mates up with and snaps into a receiving feature on sense board.

Battery module 400 may also comprise at least a side panel 428 that may encapsulate two sides of battery module 400. Side panel 428 may comprise opposite and opposing faces comprising a metal or composite material. In the illustrative embodiment of FIG. 4, a second side panel 428 is present but not illustrated so that the inside of battery module 400 may be presented. Side panel(s) 428 may provide structural support for battery module 400 and provide a barrier to separate battery module 400 from exterior components within aircraft or environment.

Figure 5:
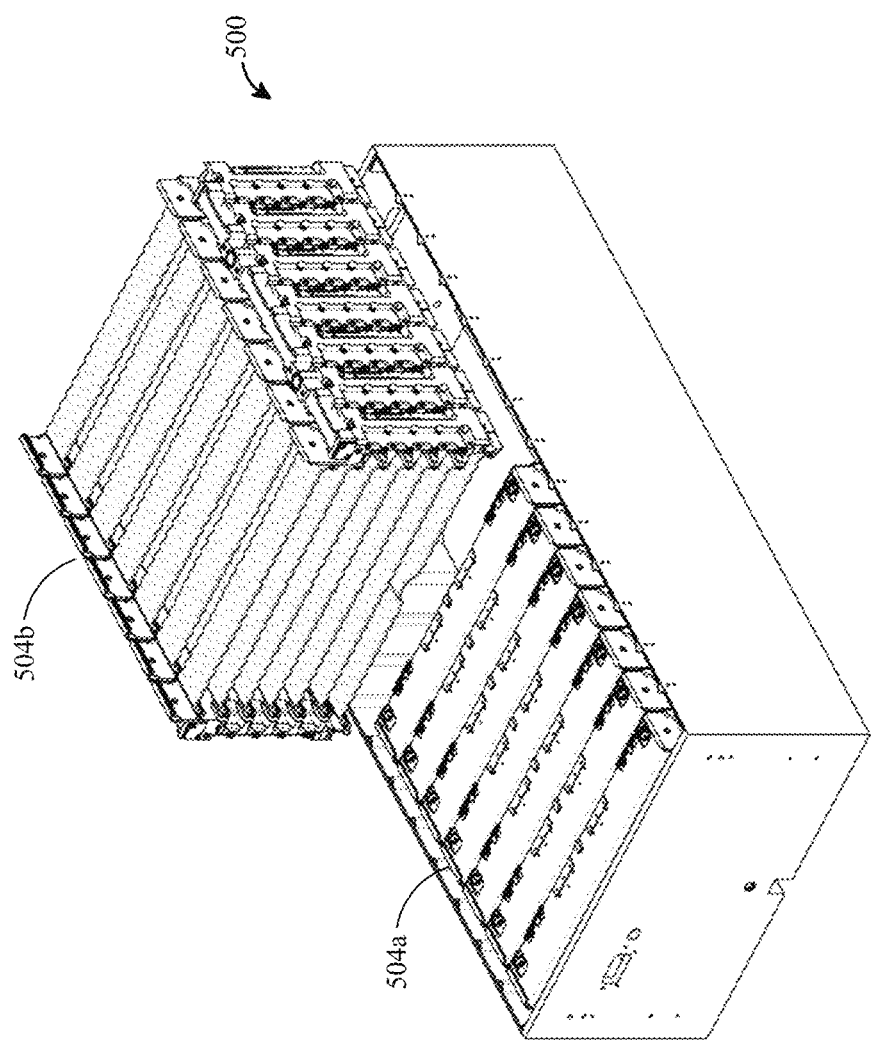
FIG. 5 is a schematic of an exemplary aircraft battery pack having a thermal conditioning circuit.

Referring now to FIG. 5, schematically illustrates an exemplary energy source, aircraft battery 500, in an isometric view. As previously mentioned, system 100 may be near or integrated into an energy source of an electric aircraft. For example, and without limitation, electric aircraft battery 500 may include a thermal conditioning circuit 504 of system 100. FIG. 5 illustrates aircraft battery 500 with one thermal conditioning circuit installed 604a and one thermal conditioning circuit uninstalled 504b. In some embodiments, battery 500 may include two or more thermal conditioning circuits 504a,b. Thermal conditioning circuits may be configured to allow coolant flow through a proximal battery module. In some cases, a thermal gradient between coolant and battery modules cools battery 500.

Figure 6:
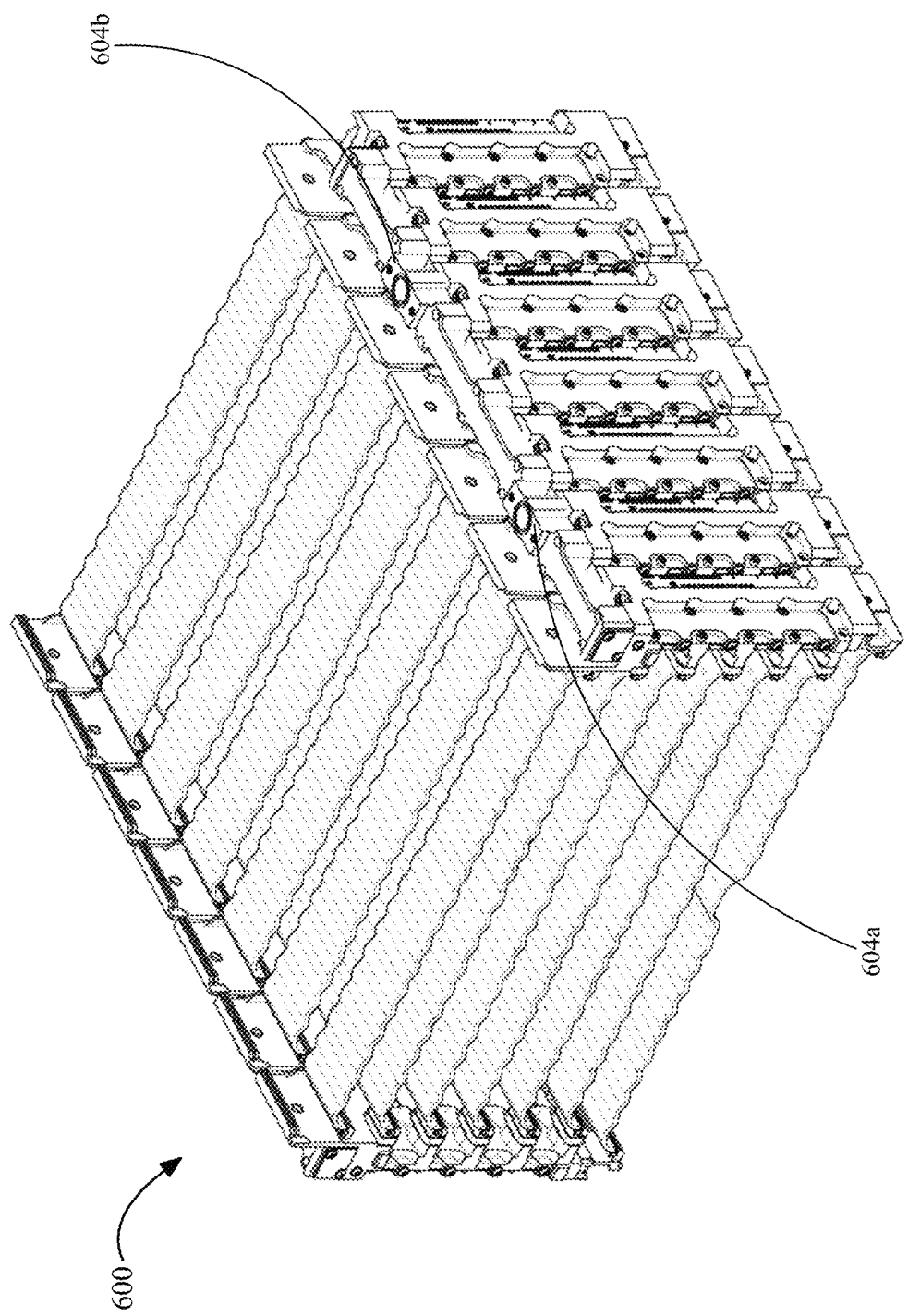
FIG. 6 schematically illustrates an exemplary thermal conditioning circuit in accordance with one or more embodiments of the present disclosure.

Referring now to FIG. 6, schematically illustrates an exemplary thermal conditioning circuit 600, in an isometric view. In some cases, aircraft battery 500 may include a thermal conditioning circuit 600. Thermal conditioning circuit 600 may be configured to accept coolant flow, for example, from channel 204, and direct coolant proximal battery module and/or battery cells. In some cases, thermal conditioning circuit 600 may be configured to direct flow of coolant out of thermal conditioning circuit after it has passed through thermal conditioning circuit. In some cases, thermal conditioning circuit 600 may be configured to return coolant, for example to coolant source 328 by way of channel 204 and channel 324. Alternatively and/or additionally, thermal conditioning circuit 600 may direct or vent coolant out of thermal conditioning circuit substantially into atmosphere. In some embodiments, thermal conditioning circuit 600 may comprise one or more coolant fittings 604a,b. Coolant fittings 604a,b may be configured to accept a flow of coolant from, for example, channel 204, channel 324, and coolant source 328. Alternatively or additionally, coolant fittings 604a,b may be configured to return a flow of coolant, for example by way of a coolant return, such as channel 204.

Figure 7A:
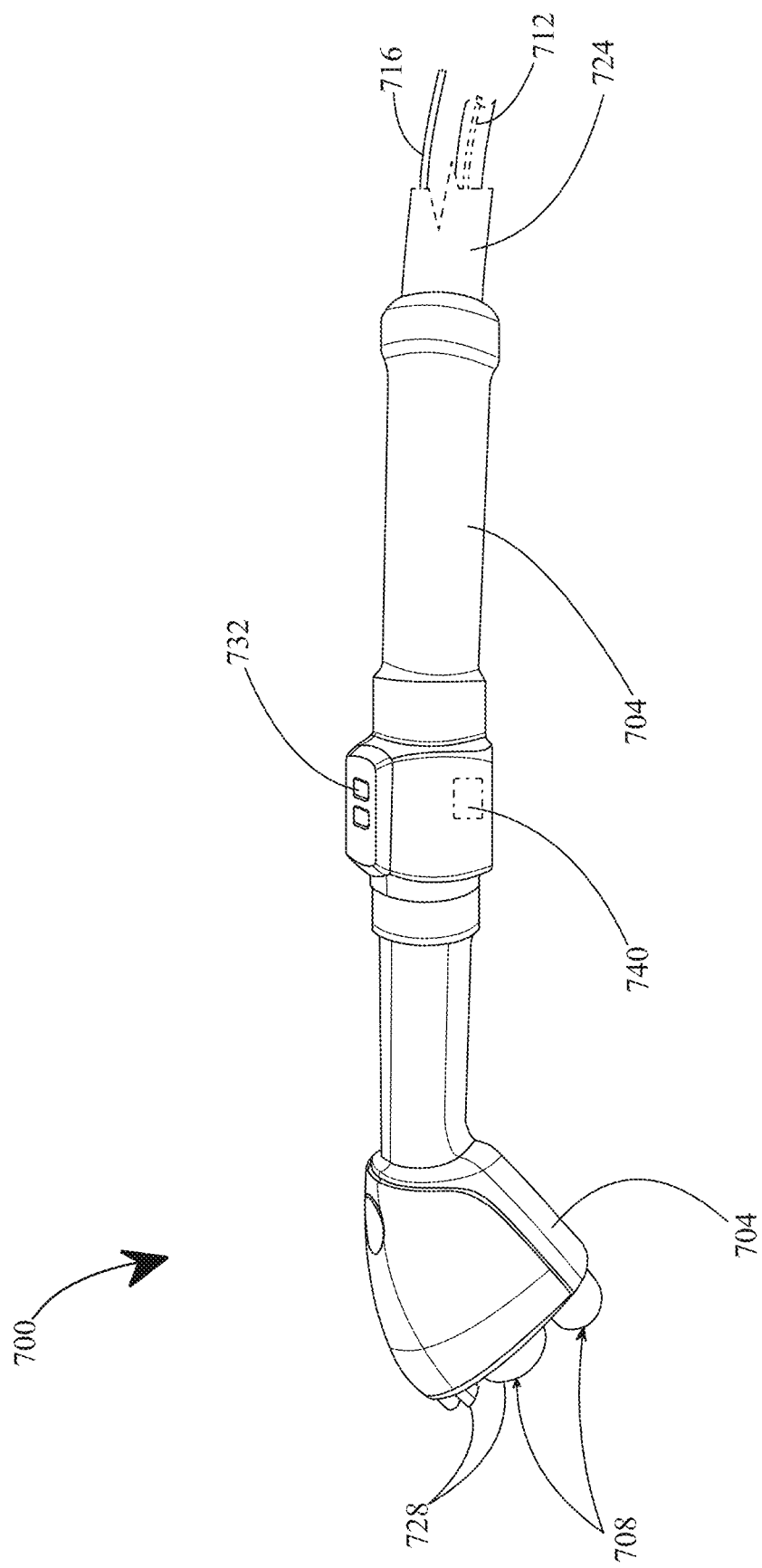
FIGS. 7A and 7B are exemplary schematics of an exemplary embodiment of a charging connector in accordance with one or more embodiments of the present disclosure.
Figure 7B:
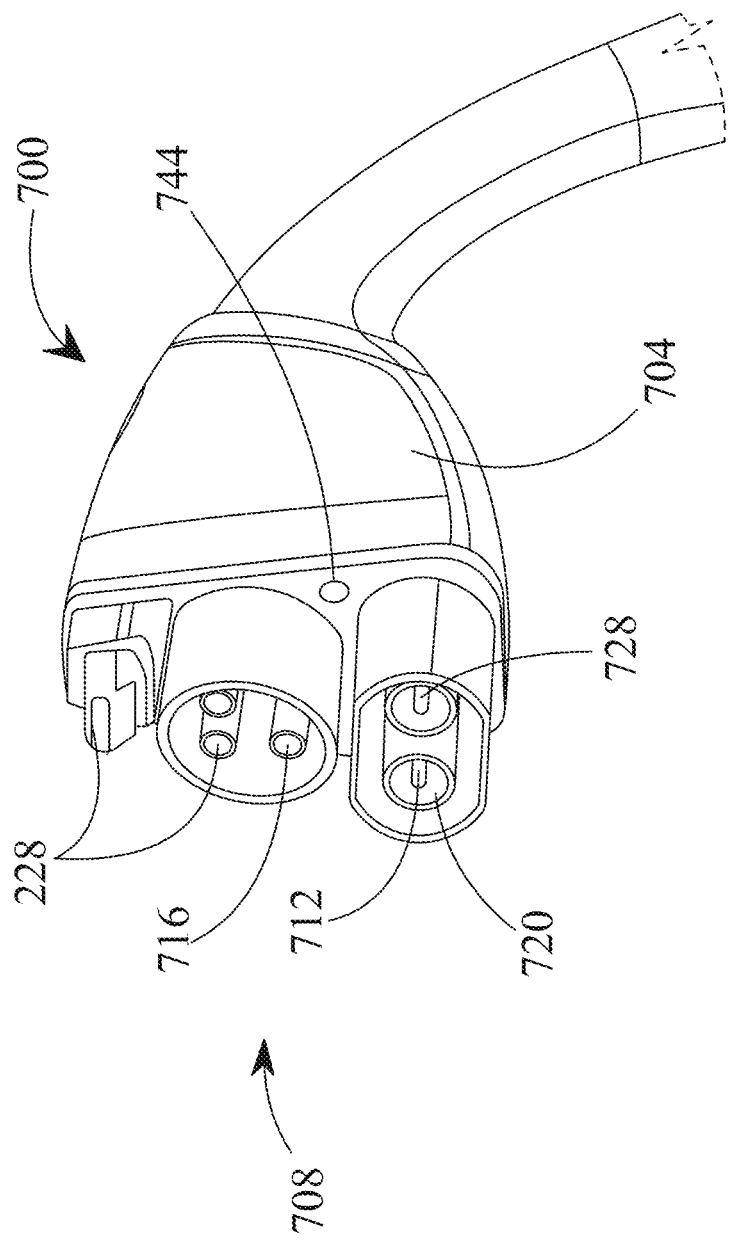

Now referring to FIGS. 7A and 7B, an exemplary embodiment of a charging connector 100 is illustrated. As shown in FIG. 7A, charging connector 700 (also referred to herein as a "connector") facilitates transfer of electrical power between a power source of a charging station and an electric aircraft, such as a power source of the electric aircraft and/or electrical systems of the electric aircraft. As used in this disclosure, "charging" refers to a process of increasing energy stored within an energy source. In some cases, and without limitation, an energy source may include a battery and charging may include providing electrical power, such as an electrical current, to the battery.

In one or more embodiments, and still referring to FIG. 7A, connector 700 may include a distal end of a flexible tether 724 or a bundle of tethers, e.g., hose, tubing, cables, wires, and the like, attached to a charging unit, such as a charging station or charger. Connector 700 is configured to connect charging unit to an electric aircraft to create an electrical communication between charging unit and electric aircraft, as discussed further in this disclosure. Connector 700 may be configured to removably attach to a port of electric aircraft using, for example, a mating component 728. As used in this disclosure, a "port" is an interface for example of an interface configured to receive another component or an interface configured to transmit and/or receive signal on a computing device. For example, and without limitation, in the case of an electric aircraft port, the port interfaces with a number of conductors 708 and/or a thermal conditioning channel 720 by way of receiving connector 700. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 7A, connector 700 may include a casing 704. In some cases, casing 704 may protect internal components of connector 700. Casing 704 may be made from various materials, such as metal alloy, aluminum, steel, plastic, synthetic material, semi-synthetic material, polymer, and the like. In some embodiments, casing 704 may be monolithic. In other embodiments, casing 704 may include a plurality of assembled components. Casing 704 and/or connector 700 may be configured to mate with a port of an electric aircraft using a mating component 728. Mating component 728 may include a mechanical or electromechanical mechanism described in this disclosure. For example, without limitation mating may include an electromechanical device used to join electrical conductors and create an electrical circuit. In some cases, mating component 728 may include gendered mating components. Gendered mating components may include a male component, such as a plug, which is inserted within a female component, such as a socket. In some cases, mating between mating components may be removable. In some cases, mating between mating components may be permanent. In some cases, mating may be removable, but require a specialized tool or key for removal. Mating may be achieved by way of one or more of plug and socket mates, pogo pin contact, crown spring mates, and the like. In some cases, mating may be keyed to ensure proper alignment of connector 700. In some cases, mate may be lockable. In one or more embodiments, casing 704 may include controls 732. Controls 732 may be actuated by a user to initiate, terminate, and/or modify parameters charging. For example, and without limitation, a button of controls 732 may be depressed by a user to initiate a transfer of electrical power from charging unit to electric aircraft. Controls 732 may include buttons, switches, slides, a touchscreen, joystick, and the like. In some embodiments, controls 732 may include a screen that displays information related to the charging of an energy source. For example, and without limitation, screen may display an amperage or voltage of electrical power being transferred to energy source of electric aircraft. Screen may also display a calculated amount of time until energy source is charged to a desired amount (e.g., desired state of charge). Screen may also display data detected by components, such as a sensor, of connector and/or electric aircraft. For example, and without limitation, screen may display a temperature of an energy source of electric aircraft. In an exemplary embodiment, a user may actuate, for example, a switch, of control 732 to initiate a cooling of a component of connector 700 and/or electric aircraft in response to displayed information and/or data on screen of connector 700. Initiating of a cooling of one or more embodiments of connector 700 may include a coolant source displacing a coolant within a thermal conditioning channel, as discussed further in this disclosure below. Controlling a transmission of electrical power and/or charging of an electric aircraft using a connector may be consistent with charging described in U.S. Nonprovisional application Ser. No. 17/405,840, filed on Aug. 18, 7021, and entitled "CONNECTOR AND METHODS OF USE FOR CHARGING AN ELECTRIC AIRCRAFT", U.S. Nonprovisional application Ser. No. 17/407,358, filed on Aug. 70, 7021, and entitled "CONNECTOR AND METHOD FOR USE FOR AUTHORIZING BATTERY CHARGING FOR AN ELECTRIC AIRCRAFT", U.S. Nonprovisional application Ser. No. 17/515,508, filed on Oct. 31, 7021, and entitled "CONNECTOR WITH AMBIENCE MONITORING CAPABILITY AND METHODS OF USE FOR CHARGING AN ELECTRIC AIRCRAFT", the entirety of each one of which is incorporated herein by reference.

With continued reference to FIG. 7A, mating component 728 of casing 704 may include a fastener. As used in this disclosure, a "fastener" is a physical component that is designed and/or configured to attach or fasten two or more components together. Connector 700 may include one or more attachment components or mechanisms, for example without limitation fasteners, threads, snaps, canted coil springs, and the like. In some cases, connector may be connected to port by way of one or more press fasteners. As used in this disclosure, a "press fastener" is a fastener that couples a first surface to a second surface when the two surfaces are pressed together. Some press fasteners include elements on the first surface that interlock with elements on the second surface; such fasteners include without limitation hook-and-loop fasteners such as VELCRO fasteners produced by Velcro Industries B.V. Limited Liability Company of Curacao Netherlands, and fasteners held together by a plurality of flanged or "mushroom"-shaped elements, such as 3M DUAL LOCK fasteners manufactured by 3M Company of Saint Paul, Minn. Press-fastener may also include adhesives, including reusable gel adhesives, GECKSKIN adhesives developed by the University of Massachusetts in Amherst, of Amherst, Mass., or other reusable adhesives. Where press-fastener includes an adhesive, the adhesive may be entirely located on the first surface of the press-fastener or on the second surface of the press-fastener, allowing any surface that can adhere to the adhesive to serve as the corresponding surface. In some cases, connector may be connected to port by way of magnetic force. For example, connector may include one or more of a magnetic, a ferromagnetic material, and/or an electromagnet. Fastener may be configured to provide removable attachment between connector 700 and port of electric aircraft. As used in this disclosure, "removable attachment" is an attributive term that refers to an attribute of one or more relata to be attached to and subsequently detached from another relata; removable attachment is a relation that is contrary to permanent attachment wherein two or more relata may be attached without any means for future detachment. Exemplary non-limiting methods of permanent attachment include certain uses of adhesives, glues, nails, engineering interference (i.e., press) fits, and the like. In some cases, detachment of two or more relata permanently attached may result in breakage of one or more of the two or more relata.

With continued reference to FIG. 7A, connector 700 may include a controller 740. Connector 700 may include one or more charging cables that each include a conductor 708, which has a distal end approximately located within connector 700 and a proximal end approximately located at an energy source of charging unit. As used in this disclosure, a "conductor" is a component that facilitates conduction. As used in this disclosure, "conduction" is a process by which one or more of heat and/or electricity is transmitted through a substance, for example, when there is a difference of effort (i.e., temperature or electrical potential) between adjoining regions. In some cases, conductor 708 may be configured to charge and/or recharge electric aircraft. For instance, conductor 708 may be connected to an energy source of a charging unit and conductor may be designed and/or configured to facilitate a specified amount of electrical power, current, or current type. For example, conductor 708 may include a direct current conductor. As used in this disclosure, a "direct current conductor" is a conductor configured to carry a direct current for recharging an energy source of electric aircraft. As used in this disclosure, "direct current" is one-directional flow of electric charge. In some cases, conductor may include an alternating current conductor. As used in this disclosure, an "alternating current conductor" is a conductor configured to carry an alternating current for recharging an energy source of electric aircraft. As used in this disclosure, an "alternating current" is a flow of electric charge that periodically reverse direction; in some cases, an alternating current may change its magnitude continuously with in time (e.g., sine wave).

In one or more embodiments, and still referring to FIG. 7A, conductor 708 may include a high-voltage conductor 712. In a non-limiting embodiment, high-voltage conductor 712 may be configured for a potential no less than 700 V. In some embodiments, high-voltage conductor may include a direct current (DC) conductor. High-voltage conductor 712 may include a DC conductor pin, which extends from casing 704 and allows for the flow of DC power into and out of the electric aircraft via port. In other embodiments, high-voltage conductor 712 may include an alternating current (AC) conductor. An AC conductor may include any component responsible for the flow of AC power into and out of the electric aircraft. The AC conductor may include a pin that extends from casing 704 that may allow for a transfer of electrical power between connector and power source of electrical aircraft. In some embodiments, a pin of high-voltage conductor 712 may include a live pin, such that the pin is the supply of DC or AC power. In other embodiments, pin of high-voltage conductor 712 may include a neutral pin, such that the pin is the return path for DC or AC power.

With continued reference to FIG. 7A, conductor may include a low-voltage conductor 716. In a non-limiting embodiment, low-voltage conductor 716 may be configured for a potential no greater than 700 V. Low-voltage conductor 716 may be configured for AC or DC current. In one or more embodiments, low-voltage conductor 716 may be used as an auxiliary charging connector to power auxiliary equipment of electric aircraft. In some embodiments, auxiliary equipment may only be powered using low-voltage conductor 716 such that auxiliary equipment is not powered after charging, thus, auxiliary equipment may be off during in-flight activities.

With continued reference to FIG. 7A, high-voltage conductor 712 and low-voltage conductor 716 may receive an electrical charging current from an energy source of charging unit. As used in this disclosure, an "energy source" is a source of electrical power, for example, for charging a battery. In some cases, energy source may include a charging battery (i.e., a battery used for charging other batteries). A charging battery is notably contrasted with an electric aircraft energy source or battery, which is located for example upon electric aircraft. As used in this disclosure, an "electrical charging current" is a flow of electrical charge that facilitates an increase in stored electrical energy of an energy storage, such as without limitation a battery. Charging battery may include a plurality of batteries, battery modules, and/or battery cells. Charging battery may be configured to store a range of electrical energy, for example a range of between about 5 KWh and about 5,000 KWh. Energy source may house a variety of electrical components. In one embodiment, energy source may contain a solar inverter. Solar inverter may be configured to produce on-site power generation. In one embodiment, power generated from solar inverter may be stored in a charging battery. In some embodiments, charging battery may include a used electric aircraft battery no longer fit for service in an aircraft.

In some embodiments, and still referring to FIG. 7A, charging battery may have a continuous power rating of at least 350 kVA. In other embodiments, charging battery may have a continuous power rating of over 350 kVA. In some embodiments, charging battery may have a battery charge range up to 950 Vdc. In other embodiments, charging battery may have a battery charge range of over 950 Vdc. In some embodiments, charging battery may have a continuous charge current of at least 350 amps. In other embodiments, charging battery may have a continuous charge current of over 350 amps. In some embodiments, charging battery may have a boost charge current of at least 500 amps. In other embodiments, charging battery may have a boost charge current of over 500 amps. In some embodiments, charging battery may include any component with the capability of recharging an energy source of an electric aircraft. In some embodiments, charging battery may include a constant voltage charger, a constant current charger, a taper current charger, a pulsed current charger, a negative pulse charger, an IUI charger, a trickle charger, and a float charger.

In one or more embodiments, and still referring to FIG. 7A, conductor 708 may be an electrical conductor, for example, a wire and/or cable, as previously mentioned above in this disclosure. Exemplary conductor materials may include metals, such as without limitation copper, nickel, steel, and the like. In one or more embodiments, conductor may be disposed within an insulation, such as an insulation sleeve that conductor is at least partially disposed within. For example, and without limitation, conductor 708 may be covered by insulation except for at conductor pin, which may contact a component or interface of port of electric aircraft as part of mating component 728. As used in this disclosure, "communication" is an attribute wherein two or more relata interact with one another, for example within a specific domain or in a certain manner. In some cases, communication between two or more relata may be of a specific domain, such as without limitation electric communication, fluidic communication, informatic communication, mechanic communication, and the like. As used in this disclosure, "electric communication" is an attribute wherein two or more relata interact with one another by way of an electric current or electricity in general. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

Now referring to FIG. 7B, in some embodiments, a charging unit may additionally include an alternating current to direct current converter configured to convert an electrical charging current from an alternating current. As used in this disclosure, an "analog current to direct current converter" is an electrical component that is configured to convert analog current to digital current. An analog current to direct current (AC-DC) converter may include an analog current to direct current power supply and/or transformer. In some cases, AC-DC converter may be located within an electric aircraft and conductors may provide an alternating current to the electric aircraft by way of conductors 708 and connector 700. Alternatively and/or additionally, in some cases, AC-DC converter may be located outside of electric aircraft and an electrical charging current may be provided by way of a direct current to the electric aircraft. In some cases, AC-DC converter may be used to recharge a charging batter. In some cases, AC-DC converter may be used to provide electrical power to one or more of coolant source 736, charging battery, and/or controller 740. In some embodiments, charging battery may have a connection to grid power component. Grid power component may be connected to an external electrical power grid. In some embodiments, grid power component may be configured to slowly charge one or more batteries in order to reduce strain on nearby electrical power grids. In one embodiment, grid power component may have an AC grid current of at least 450 amps. In some embodiments, grid power component may have an AC grid current of more or less than 450 amps. In one embodiment, grid power component may have an AC voltage connection of 480 Vac. In other embodiments, grid power component may have an AC voltage connection of above or below 480 Vac. In some embodiments, charging battery may provide power to the grid power component. In this configuration, charging battery may provide power to a surrounding electrical power grid.

With continued reference to FIG. 7B, a conductor 708 may include a control signal conductor configured to conduct a control signal. As used in this disclosure, a "control signal conductor" is a conductor configured to carry a control signal, such as a control signal between an electric aircraft and a charging unit. As used in this disclosure, a "control signal" is an electrical signal that is indicative of information. In this disclosure, "control pilot" is used interchangeably in this application with control signal. In some cases, a control signal may include an analog signal or a digital signal. In some cases, control signal may be communicated from one or more sensors, for example located within electric aircraft (e.g., within an electric aircraft battery) and/or located within connector 700. For example, in some cases, control signal may be associated with a battery within an electric aircraft. For example, control signal may include a battery sensor signal. As used in this disclosure, a "battery sensor signal" is a signal representative of a characteristic of a battery. In some cases, battery sensor signal may be representative of a characteristic of an electric aircraft battery, for example as electric aircraft battery is being recharged. In some versions, controller 740 may additionally include a sensor interface configured to receive a battery sensor signal. Sensor interface may include one or more ports, an analog to digital converter, and the like. Controller 740 may be further configured to control one or more of electrical charging current and coolant flow as a function of sensor signal from a sensor 744 and/or control signal. For example, controller 740 may control a charging battery as a function of a battery sensor signal and/or control signal. In some cases, battery sensor signal may be representative of battery temperature. In some cases, battery sensor signal may represent battery cell swell. In some cases, battery sensor signal may be representative of temperature of electric aircraft battery, for example temperature of one or more battery cells within an electric aircraft battery. In some cases, a sensor, a circuit, and/or a controller 740 may perform one or more signal processing steps on a signal. For instance, sensor, circuit or controller 740 may analyze, modify, and/or synthesize a signal in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 7B, a conductor 708 may include a ground conductor. As used in this disclosure, a "ground conductor" is a conductor configured to be in electrical communication with a ground. As used in this disclosure, a "ground" is a reference point in an electrical circuit, a common return path for electric current, or a direct physical connection to the earth. Ground may include an absolute ground such as earth or ground may include a relative (or reference) ground, for example in a floating configuration. In some cases, charging battery may include one or electrical components configured to control flow of an electric recharging current or switches, relays, direct current to direct current (DC-DC) converters, and the like. In some case, charging battery may include one or more circuits configured to provide a variable current source to provide electric recharging current, for example an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In some cases, one or more circuits within charging battery or within communication with charging battery are configured to affect electrical recharging current according to control signal from controller 740, such that the controller 740 may control at least a parameter of the electrical charging current. For example, in some cases, controller 740 may control one or more of current (Amps), potential (Volts), and/or power (Watts) of electrical charging current by way of control signal. In some cases, controller 740 may be configured to selectively engage electrical charging current, for example ON or OFF by way of control signal.

With continued reference to FIG. 7B, a conductor 708 may include a proximity signal conductor. As used in this disclosure, an "proximity signal conductor" is a conductor configured to carry a proximity signal. As used in this disclosure, a "proximity signal" is a signal that is indicative of information about a location of connector. Proximity signal may be indicative of attachment of connector with a port, for instance electric aircraft port and/or test port. In some cases, a proximity signal may include an analog signal, a digital signal, an electrical signal, an optical signal, a fluidic signal, or the like. In some cases, a proximity signal conductor may be configured to conduct a proximity signal indicative of attachment between connector 700 and a port, for example electric aircraft port.

Still referring to FIG. 7B, in some cases, connector 700 may additionally include a proximity sensor. For example, and without limitation, sensor 744 may include a proximity sensor. Proximity sensor may be electrically communicative with a proximity signal conductor. Proximity sensor may be configured to generate a proximity signal as a function of connection between connector 700 and a port, for example port of electric aircraft. As used in this disclosure, a "sensor" is a device that is configured to detect a phenomenon and transmit information related to the detection of the phenomenon. For example, in some cases a sensor may transduce a detected phenomenon, such as without limitation temperature, pressure, and the like, into a sensed signal. As used in this disclosure, a "proximity sensor" is a sensor that is configured to detect at least a phenomenon related to connecter being mated to a port. Proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like.

Still referring to FIG. 7B, in some embodiments, connector 700 may additionally include an isolation monitor conductor configured to conduct an isolation monitoring signal. In some cases, power systems for example charging battery or electric aircraft batteries must remain electrically isolated from communication, control, and/or sensor signals. As used in this disclosure, "isolation" is a state where substantially no communication of a certain type is possible between to components, for example electrical isolation refers to elements which are not in electrical communication. Often signal carrying conductors and components (e.g., sensors) may need to be in relatively close proximity with power systems and/or power carrying conductors. For instance, battery sensors which sense characteristics of batteries, for example batteries within an electric aircraft, are often by virtue of their function placed in close proximity with a battery. A battery sensor that measures battery charge and communicates a signal associated with battery charge back to controller 740 is at risk of becoming unisolated from the battery. In some cases, an isolation monitoring signal will indicate isolation of one or more components. In some cases, an isolation monitoring signal may be generated by an isolation monitoring sensor. Isolation monitoring sensor may include any sensor described in this disclosure, such as without limitation a multi-meter, an impedance meter, and/or a continuity meter. In some cases, isolation from an electrical power (e.g., battery and/or charging battery) may be required for housing of connector 700 and a ground. Isolation monitoring signal may, in some cases, communication information about isolation between an electrical power and ground, for example along a flow path that includes connector 700.

Figure 8:
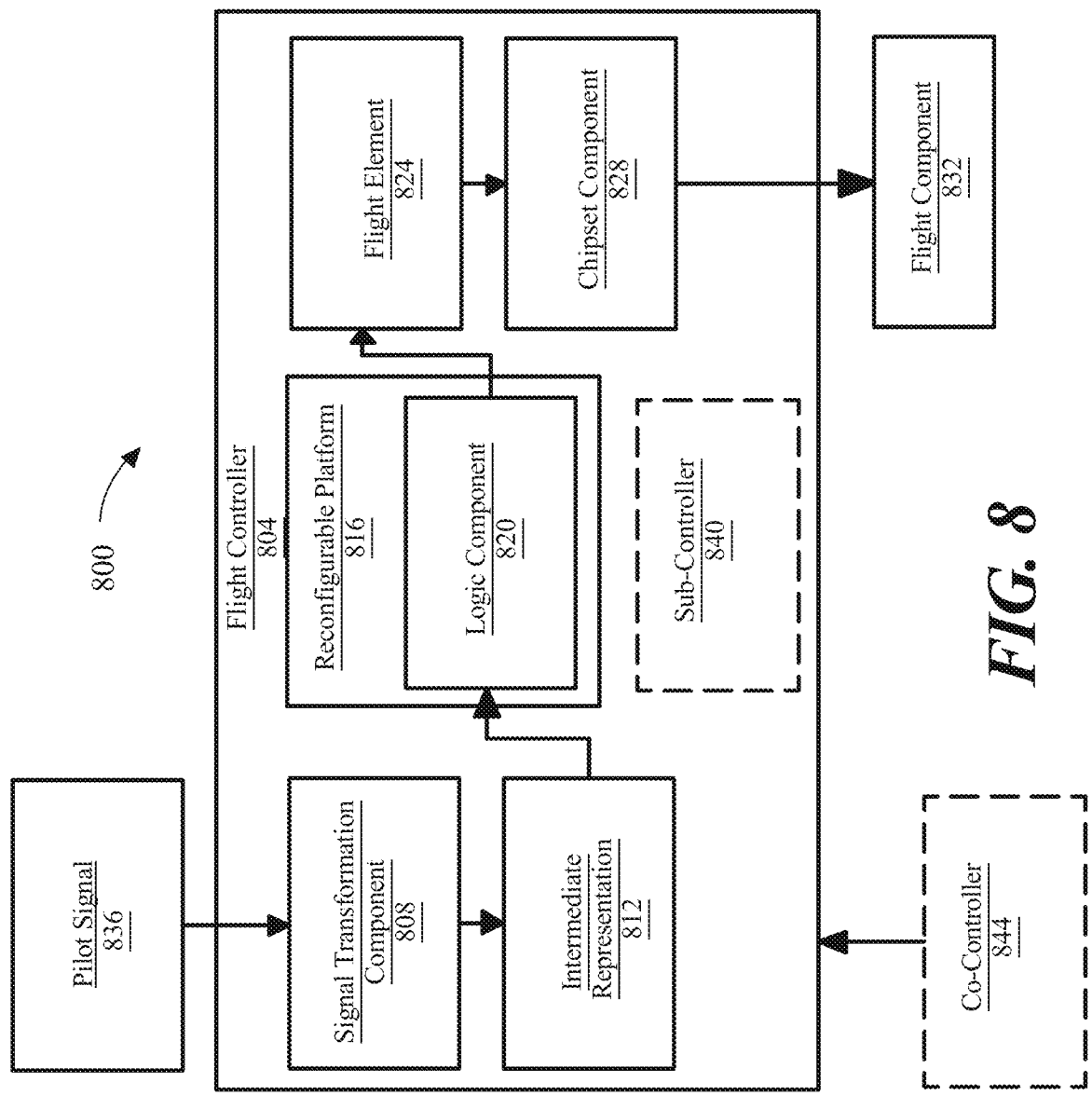
FIG. 8 is a block diagram depicting an exemplary flight controller in accordance with one or more embodiments of the present disclosure.

Now referring to FIG. 8, an exemplary embodiment 800 of a flight controller 804 is illustrated. As used in this disclosure a "flight controller" is a computing device of a plurality of computing devices dedicated to data storage, security, distribution of traffic for load balancing, and flight instruction. Flight controller 804 may include and/or communicate with any computing device as described in this disclosure, including without limitation a microcontroller, microprocessor, digital signal processor (DSP) and/or system on a chip (SoC) as described in this disclosure. Further, flight controller 804 may include a single computing device operating independently, or may include two or more computing device operating in concert, in parallel, sequentially or the like; two or more computing devices may be included together in a single computing device or in two or more computing devices. In embodiments, flight controller 804 may be installed in an aircraft, may control the aircraft remotely, and/or may include an element installed in the aircraft and a remote element in communication therewith.

In an embodiment, and still referring to FIG. 8, flight controller 804 may include a signal transformation component 808. As used in this disclosure a "signal transformation component" is a component that transforms and/or converts a first signal to a second signal, wherein a signal may include one or more digital and/or analog signals. For example, and without limitation, signal transformation component 808 may be configured to perform one or more operations such as preprocessing, lexical analysis, parsing, semantic analysis, and the like thereof. In an embodiment, and without limitation, signal transformation component 808 may include one or more analog-to-digital convertors that transform a first signal of an analog signal to a second signal of a digital signal. For example, and without limitation, an analog-to-digital converter may convert an analog input signal to a 9-bit binary digital representation of that signal. In another embodiment, signal transformation component 808 may include transforming one or more low-level languages such as, but not limited to, machine languages and/or assembly languages. For example, and without limitation, signal transformation component 808 may include transforming a binary language signal to an assembly language signal. In an embodiment, and without limitation, signal transformation component 808 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 8, signal transformation component 808 may be configured to optimize an intermediate representation 812. As used in this disclosure an "intermediate representation" is a data structure and/or code that represents the input signal. Signal transformation component 808 may optimize intermediate representation as a function of a data-flow analysis, dependence analysis, alias analysis, pointer analysis, escape analysis, and the like thereof. In an embodiment, and without limitation, signal transformation component 808 may optimize intermediate representation 812 as a function of one or more inline expansions, dead code eliminations, constant propagation, loop transformations, and/or automatic parallelization functions. In another embodiment, signal transformation component 808 may optimize intermediate representation as a function of a machine dependent optimization such as a peephole optimization, wherein a peephole optimization may rewrite short sequences of code into more efficient sequences of code. Signal transformation component 808 may optimize intermediate representation to generate an output language, wherein an "output language," as used herein, is the native machine language of flight controller 804. For example, and without limitation, native machine language may include one or more binary and/or numerical languages.

In an embodiment, and without limitation, signal transformation component 808 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 8, flight controller 804 may include a reconfigurable hardware platform 816. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 816 may be reconfigured to enact any algorithm and/or algorithm selection process received from another computing device and/or created using machine-learning processes.

Still referring to FIG. 8, reconfigurable hardware platform 816 may include a logic component 820. As used in this disclosure a "logic component" is a component that executes instructions on output language. For example, and without limitation, logic component may perform basic arithmetic, logic, controlling, input/output operations, and the like thereof. Logic component 820 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 820 may be organized according to Von Neumann and/or Harvard architecture as a non-limiting example. Logic component 820 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 820 may include one or more integrated circuit microprocessors, which may contain one or more central processing units, central processors, and/or main processors, on a single metal-oxide-semiconductor chip. Logic component 820 may be configured to execute a sequence of stored instructions to be performed on the output language and/or intermediate representation 812. Logic component 820 may be configured to fetch and/or retrieve the instruction from a memory cache, wherein a "memory cache," as used in this disclosure, is a stored instruction set on flight controller 804. Logic component 820 may be configured to decode the instruction retrieved from the memory cache to opcodes and/or operands. Logic component 820 may be configured to execute the instruction on intermediate representation 812 and/or output language. For example, and without limitation, logic component 820 may be configured to execute an addition operation on intermediate representation 812 and/or output language.

In an embodiment, and without limitation, logic component 820 may be configured to calculate a flight element 824. As used in this disclosure a "flight element" is an element of datum denoting a relative status of aircraft. For example, and without limitation, flight element 824 may denote one or more torques, thrusts, airspeed velocities, forces, altitudes, groundspeed velocities, directions during flight, directions facing, forces, orientations, and the like thereof. For example, and without limitation, flight element 824 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 824 may denote that aircraft is following a flight path accurately and/or sufficiently.

Still referring to FIG. 8, flight controller 804 may include a chipset component 828. As used in this disclosure a "chipset component" is a component that manages data flow. In an embodiment, and without limitation, chipset component 828 may include a northbridge data flow path, wherein the northbridge dataflow path may manage data flow from logic component 820 to a high-speed device and/or component, such as a RAM, graphics controller, and the like thereof. In another embodiment, and without limitation, chipset component 828 may include a southbridge data flow path, wherein the southbridge dataflow path may manage data flow from logic component 820 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 828 may manage data flow between logic component 820, memory cache, and a flight component 832. As used in this disclosure a "flight component" is a portion of an aircraft that can be moved or adjusted to affect one or more flight elements. For example, flight component 1432 may include a component used to affect the aircrafts' roll and pitch which may comprise one or more ailerons. As a further example, flight component 832 may include a rudder to control yaw of an aircraft. In an embodiment, chipset component 828 may be configured to communicate with a plurality of flight components as a function of flight element 824. For example, and without limitation, chipset component 828 may transmit to an aircraft rotor to reduce torque of a first lift propulsor and increase the forward thrust produced by a pusher component to perform a flight maneuver.

In an embodiment, and still referring to FIG. 8, flight controller 804 may be configured generate an autonomous function. As used in this disclosure an "autonomous function" is a mode and/or function of flight controller 804 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 824. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 804 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 804 will control the ailerons and/or rudders. As used in this disclosure "non-autonomous mode" is a mode that denotes a pilot will control aircraft and/or maneuvers of aircraft in its entirety.

In an embodiment, and still referring to FIG. 8, flight controller 804 may generate autonomous function as a function of an autonomous machine-learning model. As used in this disclosure an "autonomous machine-learning model" is a machine-learning model to produce an autonomous function output given flight element 824 and a pilot signal 836 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 836 may denote that a pilot is controlling and/or maneuvering ailerons, wherein the pilot is not in control of the rudders and/or propulsors. In an embodiment, pilot signal 836 may include an implicit signal and/or an explicit signal. For example, and without limitation, pilot signal 836 may include an explicit signal, wherein the pilot explicitly states there is a lack of control and/or desire for autonomous function. As a further non-limiting example, pilot signal 836 may include an explicit signal directing flight controller 804 to control and/or maintain a portion of aircraft, a portion of the flight plan, the entire aircraft, and/or the entire flight plan. As a further non-limiting example, pilot signal 836 may include an implicit signal, wherein flight controller 804 detects a lack of control such as by a malfunction, torque alteration, flight path deviation, and the like thereof. In an embodiment, and without limitation, pilot signal 836 may include one or more explicit signals to reduce torque, and/or one or more implicit signals that torque may be reduced due to reduction of airspeed velocity. In an embodiment, and without limitation, pilot signal 836 may include one or more local and/or global signals. For example, and without limitation, pilot signal 836 may include a local signal that is transmitted by a pilot and/or crew member. As a further non-limiting example, pilot signal 836 may include a global signal that is transmitted by air traffic control and/or one or more remote users that are in communication with the pilot of aircraft. In an embodiment, pilot signal 836 may be received as a function of a tri-state bus and/or multiplexor that denotes an explicit pilot signal should be transmitted prior to any implicit or global pilot signal.

Still referring to FIG. 8, autonomous machine-learning model may include one or more autonomous machine-learning processes such as supervised, unsupervised, or reinforcement machine-learning processes that flight controller 804 and/or a remote device may or may not use in the generation of autonomous function. As used in this disclosure "remote device" is an external device to flight controller 804. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 8, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 804 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 8, flight controller 804 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 804. Remote device and/or FPGA may transmit a signal, bit, datum, or parameter to flight controller 804 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 804 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 8, flight controller 804 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 8, flight controller 804 may include, but is not limited to, for example, a cluster of flight controllers in a first location and a second flight controller or cluster of flight controllers in a second location. Flight controller 804 may include one or more flight controllers dedicated to data storage, security, distribution of traffic for load balancing, and the like. Flight controller 804 may be configured to distribute one or more computing tasks as described below across a plurality of flight controllers, which may operate in parallel, in series, redundantly, or in any other manner used for distribution of tasks or memory between computing devices. For example, and without limitation, flight controller 804 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 8, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 832. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 8, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 804. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 812 and/or output language from logic component 820, wherein output language may include one or more analog-to-digital conversions, low bit rate transmissions, message encryptions, digital signals, binary signals, logic signals, analog signals, and the like thereof described above in detail.

Still referring to FIG. 8, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 8, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 8, flight controller 804 may also be implemented using a "shared nothing" architecture in which data is cached at the worker, in an embodiment, this may enable scalability of aircraft and/or computing device. Flight controller 804 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 8, flight controller may include a sub-controller 840. As used in this disclosure a "sub-controller" is a controller and/or component that is part of a distributed controller as described above; for instance, flight controller 804 may be and/or include a distributed flight controller made up of one or more sub-controllers. For example, and without limitation, sub-controller 840 may include any controllers and/or components thereof that are similar to distributed flight controller and/or flight controller as described above. Sub-controller 840 may include any component of any flight controller as described above. Sub-controller 840 may be implemented in any manner suitable for implementation of a flight controller as described above. As a further non-limiting example, sub-controller 840 may include one or more processors, logic components and/or computing devices capable of receiving, processing, and/or transmitting data across the distributed flight controller as described above. As a further non-limiting example, sub-controller 840 may include a controller that receives a signal from a first flight controller and/or first distributed flight controller component and transmits the signal to a plurality of additional sub-controllers and/or flight components.

Still referring to FIG. 8, flight controller may include a co-controller 844. As used in this disclosure a "co-controller" is a controller and/or component that joins flight controller 804 as components and/or nodes of a distributer flight controller as described above. For example, and without limitation, co-controller 844 may include one or more controllers and/or components that are similar to flight controller 804. As a further non-limiting example, co-controller 844 may include any controller and/or component that joins flight controller 804 to distributer flight controller. As a further non-limiting example, co-controller 844 may include one or more processors, logic components, and/or computing devices capable of receiving, processing, and/or transmitting data to and/or from flight controller 804 to distributed flight control system. Co-controller 844 may include any component of any flight controller as described above. Co-controller 844 may be implemented in any manner suitable for implementation of a flight controller as described above.

In an embodiment, and with continued reference to FIG. 8, flight controller 804 may be designed and/or configured to perform any method, method step, or sequence of method steps in any embodiment described in this disclosure, in any order and with any degree of repetition. For instance, flight controller 804 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
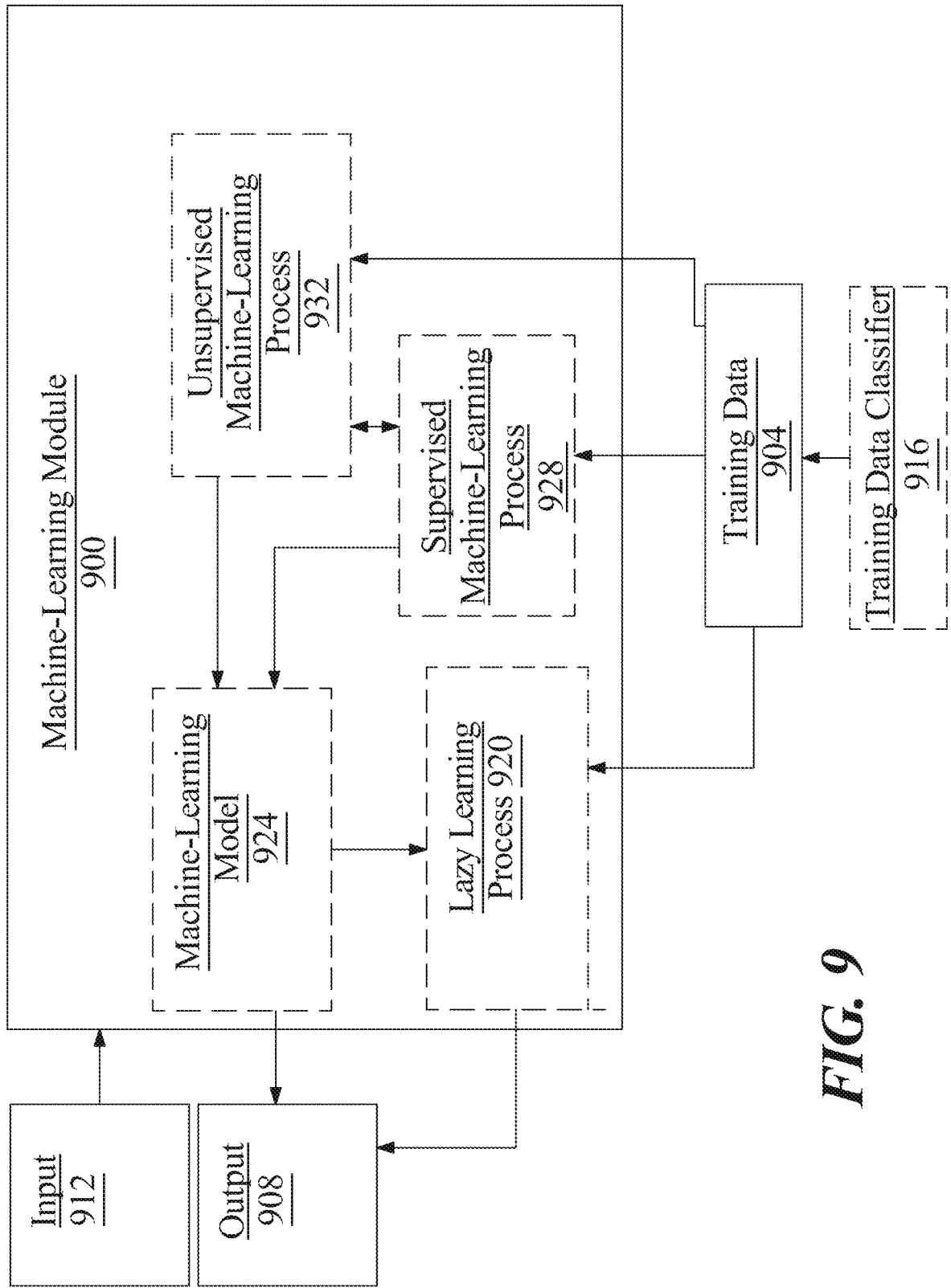
FIG. 9 is a block diagram of an exemplary machine-learning process in accordance with one or more embodiments of the present disclosure.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example flight elements and/or pilot signals may be inputs, wherein an output may be an autonomous function.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1616 may classify elements of training data to sub-categories of flight elements such as torques, forces, thrusts, directions, and the like thereof.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 10:
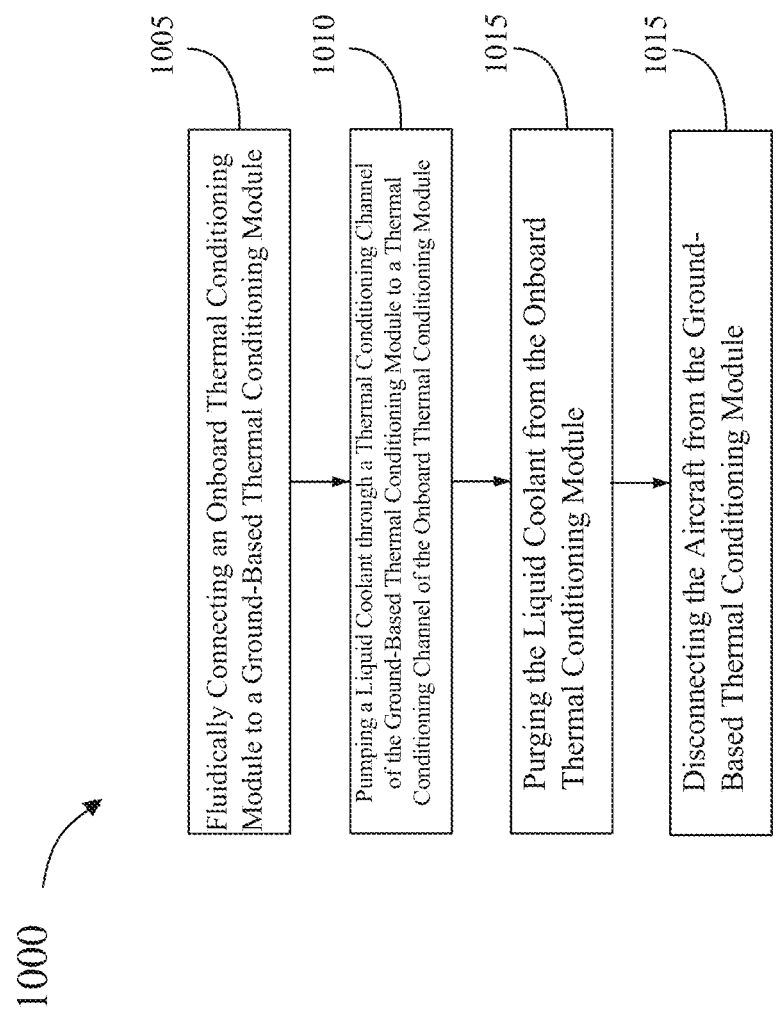
FIG. 10 is a flow diagram illustrating an exemplary method of regulating a temperature of a power supply of an electric aircraft using a thermal conditioning system in accordance with one or more embodiments of the present disclosure.

Referring now to FIG. 10, an exemplary method 1000 for ground-based thermal conditioning for an electric aircraft. Step 1005 of method 1000 includes fluidically connecting an onboard thermal conditioning module to a ground-based thermal conditioning module. Liquid coolant may cool the batteries. Liquid coolant may assist with rapid charging of the electric aircraft.

Step 1010 of method 1000 includes pumping a liquid coolant through a thermal conditioning channel of the ground-based thermal conditioning module to a thermal conditioning channel of the onboard thermal conditioning module. Liquid coolant may flow from the coolant source in the ground-based thermal conditioning module to a battery thermal conditioning circuit on the onboard thermal conditioning module in the electric aircraft. Liquid coolant may flow in a connector to the thermal conditioning channel of the onboard thermal conditioning module. Pumping the liquid coolant may occur during charging of the electric aircraft.

Step 1015 of method 1000 includes purging the liquid coolant from the onboard thermal conditioning module. Before capping the thermal conditioning channel of the onboard thermal conditioning module with a coolant cap, a pump may purge the liquid coolant from the onboard thermal conditioning module. Purging the liquid coolant refers only to purging the liquid coolant that flows from the ground-based thermal conditioning module to the onboard thermal conditioning module. There may be other coolant in the aircraft that may not be purged. The purged coolant may flow to a spent coolant reservoir on the ground-based thermal conditioning module. The liquid coolant in the spent coolant reservoir may be recycled back into the aircraft. After purging, an actuator may close the coolant cap. The coolant cap may be connected to an actuator.

Step 1020 of method 1000 includes disconnecting the aircraft from the ground-based thermal conditioning module. After purging the coolant from the electric aircraft, the coolant channel on the onboard thermal conditioning module may be capped with a coolant cap, and the connector disconnected from the aircraft.

Connector may be consistent with any connector as discussed in FIG. 1-9. Coolant may be consistent with any coolant as discussed in FIG. 1-9. Coolant cap may be consistent with any coolant cap as discussed in FIGS. 1-9. Thermal conditioning channel may be consistent with any channel as discussed in FIGS. 1-9. Spent coolant reservoir may be consistent with any spent coolant reservoir as discussed in FIGS. 1-9. Onboard thermal conditioning module may be consistent with any onboard thermal conditioning module as discussed in FIGS. 1-9. Ground-based thermal conditioning module may be consistent with any ground-based thermal conditioning module as discussed in FIGS. 1-9.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
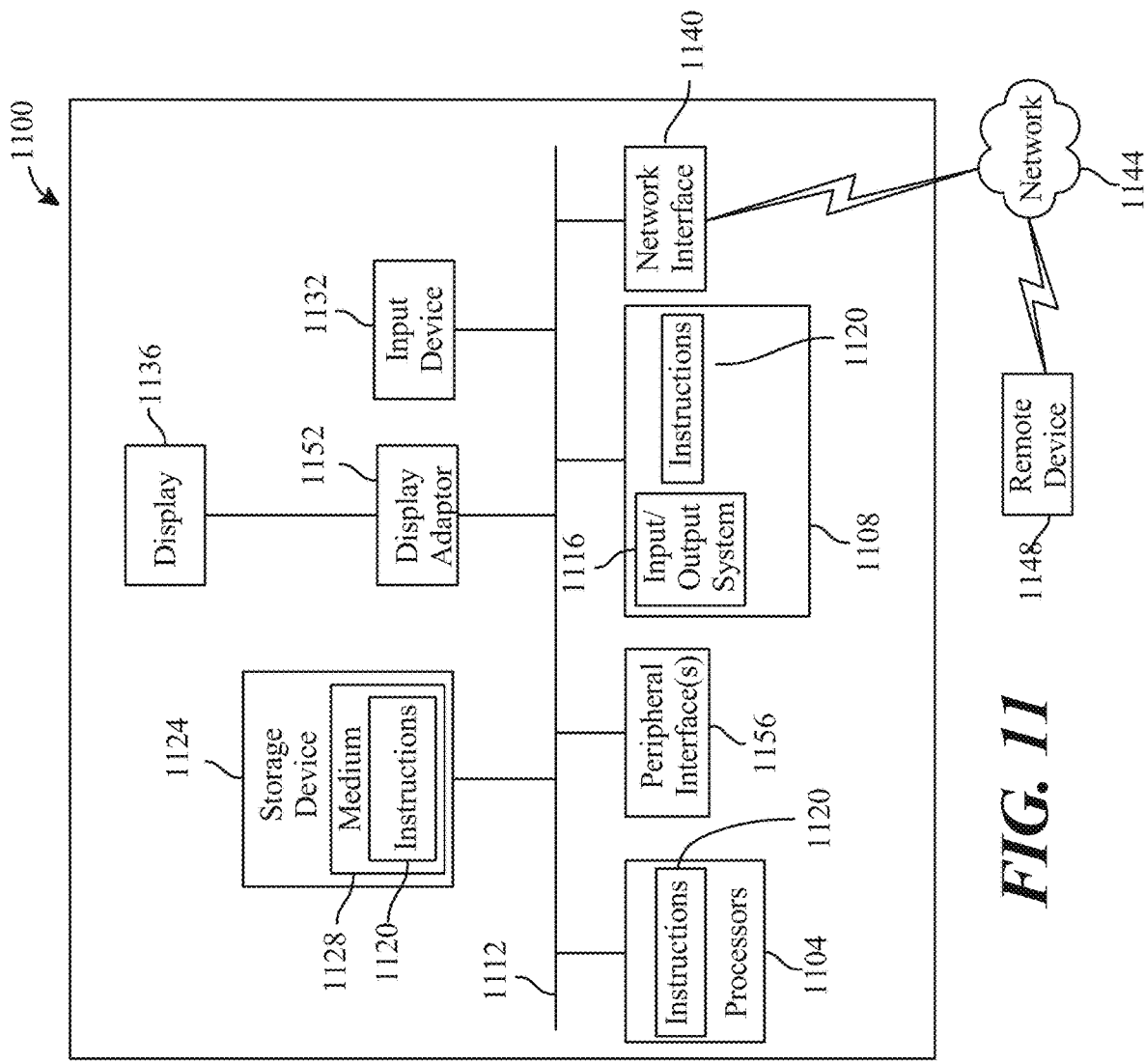
FIG. 11 is a block diagram of a computing system that can be used to implement any one or more of the methodologies disclosed herein and any one or more portions thereof.

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 1120 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method for ground-based thermal conditioning for an electric aircraft, the method comprising:
fluidically connecting an onboard thermal conditioning module to a ground-based thermal conditioning module;
pumping a liquid coolant through a thermal conditioning channel of the ground-based thermal conditioning module to a thermal conditioning channel of the onboard thermal conditioning module;
purging the liquid coolant from the onboard thermal conditioning module, wherein purging the liquid coolant comprises:
pumping a fluid through the thermal conditioning channel of the ground-based thermal conditioning module to the thermal conditioning channel of the onboard thermal conditioning module, and wherein in response to purging the liquid coolant, the liquid coolant in the onboard thermal conditioning model is replaced by the fluid; and
disconnecting the ground-based thermal conditioning module from the onboard thermal conditioning module.

2. The method of claim 1, wherein the onboard thermal conditioning module comprises a battery thermal conditioning circuit.

3. The method of claim 2, further comprising cooling a connector using the liquid coolant during rapid charging.

4. The method of claim 1, wherein pumping the liquid coolant occurs during charging of the electric aircraft.

5. The method of claim 1, wherein the liquid coolant flows from a connector to the thermal conditioning channel of the onboard thermal conditioning module.

6. The method of claim 1, wherein the ground-based thermal conditioning module includes spent coolant reservoir.

7. The method of claim 6, wherein the liquid coolant in the spent coolant reservoir is recycled back into the electric aircraft.

8. The method of claim 1, further including capping the thermal conditioning channel with a coolant cap.

9. The method of claim 8, wherein the coolant cap is connected to an actuator.

10. The method of claim 9, further comprising closing the coolant cap using the actuator after the purging of the liquid coolant.

11. A system for ground-based thermal conditioning an electric aircraft, the system comprising:
    an electric aircraft;
    an onboard thermal conditioning module;
    a ground-based thermal conditioning module fluidically connected to the onboard thermal conditioning module; and
    a liquid coolant pumped through a thermal conditioning channel of the ground-based thermal conditioning module to a thermal conditioning channel of the onboard thermal conditioning module, wherein the ground-based thermal conditioning module is configured to purge a liquid coolant from the onboard thermal conditioning module, wherein purging the liquid coolant comprises:
    pumping a fluid through the thermal conditioning channel of the ground-based thermal conditioning module to the thermal conditioning channel of the onboard thermal conditioning module, and wherein in response to purging the liquid coolant, the liquid coolant in the onboard thermal conditioning model is replaced by the fluid.

12. The system of claim 11, wherein the liquid coolant flows into a battery thermal conditioning circuit of the onboard thermal conditioning module in the electric aircraft.

13. The system of claim 12, wherein the liquid coolant cools a connector during rapid charging.

14. The system of claim 11, wherein pumping the liquid coolant occurs during charging of the electric aircraft.

15. The system of claim 11, wherein the liquid coolant flows from a connector to the thermal conditioning channel of the onboard thermal conditioning module.

16. The system of claim 11, wherein the ground-based thermal conditioning module includes spent coolant reservoir.

17. The system of claim 16, wherein the liquid coolant in the spent coolant reservoir is recycled back into the electric aircraft.

18. The system of claim 11, further including capping the thermal conditioning channel with a coolant cap.

19. The system of claim 18, wherein the coolant cap is connected to an actuator.

20. The system of claim 19, wherein the actuator closes the coolant cap after the purging of the liquid coolant.

\* \* \* \* \*